United States Patent
Withrow

(10) Patent No.: US 11,379,856 B2
(45) Date of Patent: Jul. 5, 2022

(54) CENTRALIZED DATABASES STORING DIGITAL FINGERPRINTS OF OBJECTS FOR COLLABORATIVE AUTHENTICATION

(71) Applicant: ALITHEON, INC., Bellevue, WA (US)

(72) Inventor: Justin Lynn Withrow, Bellevue, WA (US)

(73) Assignee: Alitheon, Inc., Redmond, WA (US)

( * ) Notice: Subject to any disclaimer, the term of this patent is extended or adjusted under 35 U.S.C. 154(b) by 0 days.

(21) Appl. No.: 16/917,355

(22) Filed: Jun. 30, 2020

(65) Prior Publication Data

US 2020/0334689 A1 Oct. 22, 2020

Related U.S. Application Data

(62) Division of application No. 15/635,040, filed on Jun. 27, 2017, now Pat. No. 10,740,767.

(Continued)

(51) Int. Cl.
*G06Q 30/00* (2012.01)
*G06F 16/583* (2019.01)
(Continued)

(52) U.S. Cl.
CPC ..... *G06Q 30/0185* (2013.01); *G06F 16/5838* (2019.01); *G06F 16/9535* (2019.01);
(Continued)

(58) Field of Classification Search
CPC ............ G06Q 30/0185; G06Q 30/018; G06Q 30/0207; G06Q 30/0217; G06F 16/5838; G06F 16/9535; G06K 9/00577
(Continued)

(56) References Cited

U.S. PATENT DOCUMENTS 4,218,674 A 8/1980 Broscow et al.
4,423,415 A 12/1983 Goldman
(Continued)

FOREIGN PATENT DOCUMENTS

CN 104519048 A * 4/2015 ............. G06F 21/10
DE 102006005927 A1 8/2007
(Continued)

OTHER PUBLICATIONS

Naser Zaeri, Minutiae-based Fingerprint Extraction and Recognition, 2010 (Year: 2010).*
(Continued)

*Primary Examiner* — Tarek Elchanti
(74) *Attorney, Agent, or Firm* — Cozen O'Connor

(57) ABSTRACT

Databases storing digital fingerprints of physical objects enable enhanced security and collaborative authentication. Digital fingerprints enable reliable identification of an object without the need for attaching or associating physical tags, labels or other identifying materials with the object; and serialization for identification also is obviated. By combining digital fingerprinting and data collaboration in one process, parties to the data collaboration can gain a level of certainty that data attributed to an object by different parties or at different times is attributed to only that object and not erroneously attributed to an incorrect or counterfeit object. Collaborative authentication platforms and processes, combining digital fingerprint databases with associated incentive databases, contribute enhanced information to the authentication databases, and provide unparalleled reliability and enriched metadata to supply chain tracking, detecting counterfeit objects, and other applications.

18 Claims, 11 Drawing Sheets

Related U.S. Application Data

(60) Provisional application No. 62/355,819, filed on Jun. 28, 2016.

(51) Int. Cl.
*G06F 16/9535* (2019.01)
*G06Q 30/02* (2012.01)
*G06V 20/80* (2022.01)

(52) U.S. Cl.
CPC ....... *G06Q 30/018* (2013.01); *G06Q 30/0207* (2013.01); *G06Q 30/0217* (2013.01); *G06V 20/80* (2022.01)

(58) Field of Classification Search
USPC .......................................... 705/14.19, 14.55
See application file for complete search history.

(56) References Cited

U.S. PATENT DOCUMENTS

| | | |
|---|---|---|
| 4,677,435 A | 6/1987 | D'Agraives et al. |
| 4,700,400 A | 10/1987 | Ross |
| 4,883,971 A | 11/1989 | Jensen |
| 4,921,107 A | 5/1990 | Hofer |
| 5,031,223 A | 7/1991 | Rosenbaum et al. |
| 5,079,714 A | 1/1992 | Manduley et al. |
| 5,393,939 A | 2/1995 | Nasuta, Jr. et al. |
| 5,422,821 A | 6/1995 | Allen et al. |
| 5,514,863 A | 5/1996 | Williams |
| 5,518,122 A | 5/1996 | Tilles et al. |
| 5,521,984 A | 5/1996 | Denenberg et al. |
| 5,703,783 A | 12/1997 | Allen et al. |
| 5,719,939 A | 2/1998 | Tel |
| 5,734,568 A | 3/1998 | Borgendale et al. |
| 5,745,590 A | 4/1998 | Pollard |
| 5,883,971 A | 3/1999 | Bolle et al. |
| 5,923,848 A | 7/1999 | Goodhand et al. |
| 5,974,150 A | 10/1999 | Kaish et al. |
| 6,205,261 B1 | 3/2001 | Goldberg |
| 6,246,794 B1 | 6/2001 | Kagehiro et al. |
| 6,292,709 B1 | 9/2001 | Uhl et al. |
| 6,327,373 B1 | 12/2001 | Yura |
| 6,343,327 B2 | 1/2002 | Daniels, Jr. et al. |
| 6,360,001 B1 | 3/2002 | Berger et al. |
| 6,370,259 B1 | 4/2002 | Hobson et al. |
| 6,400,805 B1 | 6/2002 | Brown et al. |
| 6,421,453 B1 | 7/2002 | Kanevsky et al. |
| 6,424,728 B1 | 7/2002 | Ammar |
| 6,434,601 B1 | 8/2002 | Rollins |
| 6,470,091 B2 | 10/2002 | Koga et al. |
| 6,539,098 B1 | 3/2003 | Baker et al. |
| 6,549,892 B1 | 4/2003 | Sansone |
| 6,597,809 B1 | 7/2003 | Ross et al. |
| 6,643,648 B1 | 11/2003 | Ross et al. |
| 6,697,500 B2 | 2/2004 | Woolston et al. |
| 6,741,724 B1 | 5/2004 | Bruce et al. |
| 6,768,810 B2 | 7/2004 | Emanuelsson et al. |
| 6,778,703 B1 | 8/2004 | Zlotnick |
| 6,805,926 B2 | 10/2004 | Cote et al. |
| 6,816,602 B2 | 11/2004 | Coffelt et al. |
| 6,829,369 B2 | 12/2004 | Poulin et al. |
| 6,940,391 B1 | 9/2005 | Ishikura et al. |
| 6,961,466 B2 | 11/2005 | Imagawa et al. |
| 6,985,925 B2 | 1/2006 | Ogawa |
| 6,985,926 B1 | 1/2006 | Ferlauto et al. |
| 7,016,532 B2 | 3/2006 | Boncyk et al. |
| 7,031,519 B2 | 4/2006 | Elmenhurst |
| 7,096,152 B1 | 8/2006 | Ong |
| 7,120,302 B1 | 10/2006 | Billester |
| 7,121,458 B2 | 10/2006 | Avant et al. |
| 7,152,047 B1 | 12/2006 | Nagel |
| 7,171,049 B2 | 1/2007 | Snapp |
| 7,204,415 B2 | 4/2007 | Payne et al. |
| 7,212,949 B2 | 5/2007 | Baehrach |
| 7,333,987 B2 | 2/2008 | Ross et al. |
| 7,343,623 B2 | 3/2008 | Ross |
| 7,356,162 B2 | 4/2008 | Caillon |
| 7,379,603 B2 | 5/2008 | Ross et al. |
| 7,436,979 B2 | 10/2008 | Bruce |
| 7,477,780 B2 | 1/2009 | Boncyk et al. |
| 7,518,080 B2 | 4/2009 | Amato |
| 7,602,938 B2 | 10/2009 | Proloski |
| 7,674,995 B2 | 3/2010 | Desprez et al. |
| 7,676,433 B1 | 3/2010 | Ross et al. |
| 7,680,306 B2 | 3/2010 | Boutant et al. |
| 7,720,256 B2 | 5/2010 | Desprez et al. |
| 7,726,457 B2 | 6/2010 | Maier et al. |
| 7,726,548 B2 | 6/2010 | DeLaVergne |
| 7,748,029 B2 | 6/2010 | Ross |
| 7,822,263 B1 | 10/2010 | Prokoski |
| 7,834,289 B2 | 11/2010 | Orbke |
| 7,853,792 B2 | 12/2010 | Cowburn |
| 8,022,832 B2 | 9/2011 | Vogt et al. |
| 8,032,927 B2 | 10/2011 | Ross |
| 8,108,309 B2 | 1/2012 | Tan |
| 8,162,125 B1 | 4/2012 | Csulits et al. |
| 8,180,174 B2 | 5/2012 | Di Venuto |
| 8,180,667 B1 | 5/2012 | Baluja et al. |
| 8,194,938 B2 | 6/2012 | Wechsler et al. |
| 8,316,418 B2 | 11/2012 | Ross |
| 8,374,020 B2 | 2/2013 | Katti |
| 8,374,399 B1 | 2/2013 | Talwerdi |
| 8,374,920 B2 | 2/2013 | Hedges et al. |
| 8,391,583 B1 | 3/2013 | Mennie et al. |
| 8,428,772 B2 | 4/2013 | Miette |
| 8,437,530 B1 | 5/2013 | Mennie et al. |
| 8,457,354 B1 | 6/2013 | Kolar et al. |
| 8,477,992 B2 | 7/2013 | Paul et al. |
| 8,520,888 B2 | 8/2013 | Spitzig |
| 8,526,743 B1 | 9/2013 | Campbell et al. |
| 8,774,455 B2 | 7/2014 | Elmenhurst et al. |
| 8,856,881 B2 | 10/2014 | Mouleswaran et al. |
| 8,959,029 B2 | 2/2015 | Jones et al. |
| 9,031,329 B1 | 5/2015 | Farid et al. |
| 9,058,543 B2 | 6/2015 | Campbell |
| 9,152,862 B2 | 10/2015 | Ross |
| 9,170,654 B2 | 10/2015 | Boncyk et al. |
| 9,224,196 B2 | 12/2015 | Duerksen et al. |
| 9,234,843 B2 | 1/2016 | Sopori et al. |
| 9,245,133 B1 | 1/2016 | Durst et al. |
| 9,350,552 B2 | 5/2016 | Elmenhurst et al. |
| 9,350,714 B2 | 5/2016 | Freeman et al. |
| 9,361,507 B1 | 6/2016 | Hoyos et al. |
| 9,361,596 B2 | 6/2016 | Ross et al. |
| 9,424,461 B1 | 8/2016 | Yuan et al. |
| 9,443,298 B2 | 9/2016 | Ross et al. |
| 9,558,463 B2 | 1/2017 | Ross et al. |
| 9,582,714 B2 | 2/2017 | Ross et al. |
| 9,646,206 B2 | 5/2017 | Ross et al. |
| 9,665,800 B1 | 5/2017 | Kuffner |
| 9,741,724 B2 | 8/2017 | Seshadri et al. |
| 10,037,537 B2 | 7/2018 | Withrow et al. |
| 10,043,073 B2 | 8/2018 | Ross et al. |
| 10,192,140 B2 | 1/2019 | Ross et al. |
| 10,199,886 B2 | 2/2019 | Li et al. |
| 10,346,852 B2 | 7/2019 | Ross et al. |
| 10,505,726 B1 | 12/2019 | Andon et al. |
| 10,540,664 B2 | 1/2020 | Ross et al. |
| 10,572,883 B2 | 2/2020 | Ross et al. |
| 10,614,302 B2 | 4/2020 | Withrow et al. |
| 10,621,594 B2 | 4/2020 | Land et al. |
| 10,740,767 B2 | 8/2020 | Withrow |
| 10,936,838 B1 | 3/2021 | Wong |
| 2001/0010334 A1 | 8/2001 | Park et al. |
| 2001/0054031 A1 | 12/2001 | Lee et al. |
| 2002/0015515 A1 | 2/2002 | Lichtermann et al. |
| 2002/0073049 A1 | 6/2002 | Dutta |
| 2002/0134836 A1 | 9/2002 | Cash et al. |
| 2002/0168090 A1 | 11/2002 | Bruce et al. |
| 2003/0015395 A1 | 1/2003 | Hallowell et al. |
| 2003/0046103 A1 | 3/2003 | Amato et al. |
| 2003/0091724 A1 | 5/2003 | Mizoguchi |
| 2003/0120677 A1 | 6/2003 | Vernon |
| 2003/0138128 A1 | 7/2003 | Rhoads |

(56) References Cited

U.S. PATENT DOCUMENTS

| | | |
|---|---|---|
| 2003/0179931 A1 | 9/2003 | Sun |
| 2003/0182018 A1 | 9/2003 | Snapp |
| 2003/0208298 A1 | 11/2003 | Edmonds |
| 2003/0219145 A1 | 11/2003 | Smith |
| 2004/0027630 A1 | 2/2004 | Lizotte |
| 2004/0101174 A1 | 5/2004 | Sato et al. |
| 2004/0112962 A1 | 6/2004 | Farrall et al. |
| 2004/0218791 A1 | 11/2004 | Jiang et al. |
| 2004/0218801 A1 | 11/2004 | Houle et al. |
| 2004/0250085 A1 | 12/2004 | Tattan et al. |
| 2005/0007776 A1 | 1/2005 | Monk et al. |
| 2005/0038756 A1 | 2/2005 | Nagel |
| 2005/0065719 A1 | 3/2005 | Khan et al. |
| 2005/0086256 A1 | 4/2005 | Owens et al. |
| 2005/0111618 A1 | 5/2005 | Sommer et al. |
| 2005/0119786 A1 | 6/2005 | Kadaba |
| 2005/0125360 A1 | 6/2005 | Tidwell et al. |
| 2005/0131576 A1 | 6/2005 | De Leo et al. |
| 2005/0137882 A1 | 6/2005 | Cameron et al. |
| 2005/0160271 A9 | 7/2005 | Brundage et al. |
| 2005/0169529 A1 | 8/2005 | Owechko et al. |
| 2005/0188213 A1 | 8/2005 | Xu |
| 2005/0204144 A1 | 9/2005 | Mizutani |
| 2005/0251285 A1 | 11/2005 | Boyce et al. |
| 2005/0257064 A1 | 11/2005 | Boutant et al. |
| 2005/0289061 A1 | 12/2005 | Kulakowski et al. |
| 2006/0010503 A1 | 1/2006 | Inoue et al. |
| 2006/0043169 A1 | 3/2006 | Haertel |
| 2006/0083414 A1 | 4/2006 | Neumann et al. |
| 2006/0109520 A1 | 5/2006 | Gossaye et al. |
| 2006/0131518 A1 | 6/2006 | Ross et al. |
| 2006/0177104 A1 | 8/2006 | Prokoski |
| 2006/0253406 A1 | 11/2006 | Caillon |
| 2007/0036470 A1 | 2/2007 | Piersol et al. |
| 2007/0056041 A1† | 3/2007 | Goodman |
| 2007/0071291 A1 | 3/2007 | Yumoto et al. |
| 2007/0085710 A1 | 4/2007 | Bousquet et al. |
| 2007/0094155 A1 | 4/2007 | Dearing |
| 2007/0211651 A1 | 9/2007 | Ahmed et al. |
| 2007/0211964 A1 | 9/2007 | Agam et al. |
| 2007/0223791 A1 | 9/2007 | Shinzaki |
| 2007/0230656 A1 | 10/2007 | Lowes et al. |
| 2007/0263267 A1 | 11/2007 | Ditt |
| 2007/0269043 A1 | 11/2007 | Launay et al. |
| 2007/0282900 A1 | 12/2007 | Owens et al. |
| 2008/0005578 A1 | 1/2008 | Shafir |
| 2008/0008377 A1 | 1/2008 | Andel et al. |
| 2008/0011841 A1 | 1/2008 | Self et al. |
| 2008/0013804 A1 | 1/2008 | Moon et al. |
| 2008/0016355 A1 | 1/2008 | Beun et al. |
| 2008/0128496 A1 | 6/2008 | Bertranou et al. |
| 2008/0130947 A1 | 6/2008 | Ross et al. |
| 2008/0219503 A1 | 9/2008 | Di Venuto et al. |
| 2008/0250483 A1 | 10/2008 | Lee |
| 2008/0255758 A1 | 10/2008 | Graham et al. |
| 2008/0272585 A1 | 11/2008 | Conard et al. |
| 2008/0290005 A1 | 11/2008 | Bennett et al. |
| 2008/0294474 A1 | 11/2008 | Furka |
| 2009/0028379 A1 | 1/2009 | Belanger et al. |
| 2009/0057207 A1 | 3/2009 | Orbke et al. |
| 2009/0106042 A1 | 4/2009 | Maytal et al. |
| 2009/0134222 A1 | 5/2009 | Ikeda |
| 2009/0154778 A1 | 6/2009 | Lei et al. |
| 2009/0157733 A1 | 6/2009 | Kim et al. |
| 2009/0223099 A1 | 9/2009 | Versteeg |
| 2009/0232361 A1 | 9/2009 | Miller |
| 2009/0245652 A1 | 10/2009 | Bastos dos Santos |
| 2009/0271029 A1 | 10/2009 | Doutre |
| 2009/0283583 A1 | 11/2009 | Cowburn et al. |
| 2009/0287498 A2 | 11/2009 | Choi |
| 2009/0307005 A1 | 12/2009 | O'Martin et al. |
| 2010/0027834 A1 | 2/2010 | Spitzig et al. |
| 2010/0070527 A1 | 3/2010 | Chen |
| 2010/0104200 A1 | 4/2010 | Baras et al. |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette et al. |
| 2010/0286815 A1 | 11/2010 | Zimmermann |
| 2011/0026831 A1 | 2/2011 | Perronnin et al. |
| 2011/0049235 A1 | 3/2011 | Gerigk et al. |
| 2011/0064279 A1 | 3/2011 | Uno |
| 2011/0081043 A1 | 4/2011 | Sabol et al. |
| 2011/0091068 A1 | 4/2011 | Stuck et al. |
| 2011/0161117 A1 | 6/2011 | Busque et al. |
| 2011/0188709 A1 | 8/2011 | Gupta et al. |
| 2011/0194780 A1 | 8/2011 | Li et al. |
| 2011/0235920 A1 | 9/2011 | Iwamoto et al. |
| 2011/0267192 A1 | 11/2011 | Goldman et al. |
| 2012/0011119 A1 | 1/2012 | Baheti et al. |
| 2012/0042171 A1 | 2/2012 | White et al. |
| 2012/0089639 A1 | 4/2012 | Wang |
| 2012/0130868 A1 | 5/2012 | Loken |
| 2012/0177281 A1 | 7/2012 | Frew |
| 2012/0185393 A1 | 7/2012 | Atsmon et al. |
| 2012/0199651 A1 | 8/2012 | Glazer |
| 2012/0242481 A1 | 9/2012 | Gernandt et al. |
| 2012/0243797 A1 | 9/2012 | Dayer et al. |
| 2012/0250945 A1 | 10/2012 | Peng et al. |
| 2013/0110719 A1 | 5/2013 | Carter et al. |
| 2013/0162394 A1 | 6/2013 | Etchegoyen |
| 2013/0212027 A1 | 8/2013 | Sharma et al. |
| 2013/0214164 A1 | 8/2013 | Zhang et al. |
| 2013/0273968 A1 | 10/2013 | Rhoads et al. |
| 2013/0277425 A1 | 10/2013 | Sharma et al. |
| 2013/0284803 A1 | 10/2013 | Wood et al. |
| 2014/0032322 A1* | 1/2014 | Schwieger ............ G06Q 30/02 705/14.55 |
| 2014/0140570 A1 | 5/2014 | Ross et al. |
| 2014/0140571 A1 | 5/2014 | Elmenhurst et al. |
| 2014/0201094 A1 | 7/2014 | Herrington et al. |
| 2014/0184843 A1 | 9/2014 | Campbell et al. |
| 2014/0270341 A1 | 9/2014 | Elmenhurst et al. |
| 2014/0314283 A1 | 10/2014 | Harding |
| 2014/0355890 A1 | 12/2014 | Highley |
| 2014/0380446 A1 | 12/2014 | Niu et al. |
| 2015/0043023 A1 | 2/2015 | Ito |
| 2015/0058142 A1 | 2/2015 | Lenahan |
| 2015/0067346 A1 | 3/2015 | Ross et al. |
| 2015/0078629 A1 | 3/2015 | Gottemukkula et al. |
| 2015/0086068 A1 | 3/2015 | Mulhearn et al. |
| 2015/0110364 A1 | 4/2015 | Niinuma et al. |
| 2015/0117701 A1 | 4/2015 | Ross et al. |
| 2015/0127430 A1 | 5/2015 | Hammer, III |
| 2015/0248587 A1 | 9/2015 | Oami et al. |
| 2015/0294189 A1 | 10/2015 | Benhimane et al. |
| 2015/0309502 A1 | 10/2015 | Breitgand et al. |
| 2015/0371087 A1 | 12/2015 | Ross et al. |
| 2016/0034913 A1 | 2/2016 | Zavarehi et al. |
| 2016/0034914 A1 | 2/2016 | Gonen et al. |
| 2016/0055651 A1 | 2/2016 | Oami |
| 2016/0057138 A1 | 2/2016 | Hoyos et al. |
| 2016/0072626 A1 | 3/2016 | Kouladjie |
| 2016/0117631 A1 | 4/2016 | McCloskey et al. |
| 2016/0162734 A1 | 6/2016 | Ross et al. |
| 2016/0180485 A1 | 6/2016 | Avila et al. |
| 2016/0180546 A1 | 6/2016 | Kim et al. |
| 2016/0189510 A1 | 6/2016 | Hutz |
| 2016/0203387 A1 | 7/2016 | Lee et al. |
| 2016/0300234 A1 | 10/2016 | Moss-Pultz et al. |
| 2016/0335520 A1 | 11/2016 | Ross et al. |
| 2017/0004444 A1 | 1/2017 | Krasko et al. |
| 2017/0032285 A1 | 2/2017 | Sharma et al. |
| 2017/0076132 A1 | 3/2017 | Sezan et al. |
| 2017/0132458 A1 | 5/2017 | Short et al. |
| 2017/0153069 A1 | 6/2017 | Huang et al. |
| 2017/0243230 A1 | 8/2017 | Ross et al. |
| 2017/0243231 A1 | 8/2017 | Withrow et al. |
| 2017/0243232 A1 | 8/2017 | Ross et al. |
| 2017/0243233 A1 | 8/2017 | Land et al. |
| 2017/0249491 A1 | 8/2017 | Macintosh et al. |
| 2017/0251143 A1 | 8/2017 | Peruch et al. |
| 2017/0253069 A1 | 9/2017 | Kerkar et al. |
| 2017/0295301 A1 | 10/2017 | Liu et al. |

(56) References Cited

U.S. PATENT DOCUMENTS

| | | |
|---|---|---|
| 2017/0300905 A1 | 10/2017 | Withrow et al. |
| 2017/0344823 A1 | 11/2017 | Withrow et al. |
| 2017/0344824 A1 | 11/2017 | Martin |
| 2017/0372327 A1 | 12/2017 | Withrow |
| 2018/0000359 A1 | 1/2018 | Watanabe |
| 2018/0012008 A1 | 1/2018 | Withrow et al. |
| 2018/0018627 A1 | 1/2018 | Ross et al. |
| 2018/0018838 A1 | 1/2018 | Fankhauser et al. |
| 2018/0024074 A1 | 1/2018 | Ranieri et al. |
| 2018/0024178 A1 | 1/2018 | House et al. |
| 2018/0047128 A1 | 2/2018 | Ross et al. |
| 2018/0053312 A1 | 2/2018 | Ross et al. |
| 2018/0121643 A1 | 5/2018 | Talwerdi et al. |
| 2018/0129861 A1 | 5/2018 | Kim et al. |
| 2018/0144211 A1 | 5/2018 | Ross et al. |
| 2018/0174586 A1 | 6/2018 | Zamora Esquivel et al. |
| 2018/0218505 A1 | 8/2018 | Kim et al. |
| 2018/0293370 A1 | 10/2018 | Kim et al. |
| 2018/0315058 A1 | 11/2018 | Withrow et al. |
| 2018/0341766 A1 | 11/2018 | Anagnostopoulos |
| 2018/0349694 A1 | 12/2018 | Ross et al. |
| 2019/0026581 A1 | 1/2019 | Leizerson |
| 2019/0034694 A1 | 1/2019 | Ross |
| 2019/0102873 A1 | 4/2019 | Wang et al. |
| 2019/0102973 A1 | 4/2019 | Oyama et al. |
| 2019/0130082 A1 | 5/2019 | Alameh et al. |
| 2019/0220868 A1 | 7/2019 | Ross et al. |
| 2019/0228174 A1 | 7/2019 | Withrow et al. |
| 2019/0266373 A1 | 8/2019 | Hirokawa |
| 2019/0279017 A1 | 9/2019 | Graham et al. |
| 2019/0287118 A1 | 9/2019 | Ross et al. |
| 2019/0342102 A1 | 11/2019 | Hao et al. |
| 2019/0354822 A1 | 11/2019 | Pic et al. |
| 2019/0362186 A1 | 11/2019 | Irshad et al. |
| 2020/0153822 A1 | 5/2020 | Land et al. |
| 2020/0226366 A1 | 7/2020 | Withrow et al. |
| 2020/0233901 A1 | 7/2020 | Crowley et al. |
| 2020/0250395 A1 | 8/2020 | Ross et al. |
| 2020/0257791 A1 | 8/2020 | Ross et al. |
| 2020/0334689 A1 | 10/2020 | Withrow |
| 2020/0349379 A1 | 11/2020 | Ross |
| 2020/0356751 A1 | 11/2020 | Matsuda et al. |
| 2020/0356772 A1 | 11/2020 | Withrow et al. |
| 2021/0375291 A1 | 12/2021 | Zeng et al. |

FOREIGN PATENT DOCUMENTS

| | | |
|---|---|---|
| EP | 0439669 A2 | 8/1991 |
| EP | 0759596 A2 | 2/1997 |
| EP | 1016548 A2 | 7/2000 |
| EP | 1016549 A1 | 7/2000 |
| EP | 1719070 B1 | 4/2009 |
| EP | 2107506 A1 | 10/2009 |
| EP | 2166493 A1 | 3/2010 |
| EP | 2195621 A2 | 11/2013 |
| EP | 2866193 A1 | 4/2015 |
| EP | 2257909 B1 | 5/2015 |
| EP | 2869240 A2 | 5/2015 |
| EP | 2869241 A2 | 5/2015 |
| EP | 3208744 A1 | 8/2017 |
| EP | 3249581 A1 | 11/2017 |
| EP | 3267384 A1 | 1/2018 |
| EP | 3270342 A1 | 1/2018 |
| EP | 3435287 A2 | 1/2019 |
| EP | 3514715 A1 | 7/2019 |
| ES | 2467465 A2 | 6/2014 |
| GB | 2097979 A | 11/1982 |
| GB | 2446837 A | 8/2008 |
| GB | 2482127 | 1/2012 |
| JP | S61234481 A | 10/1986 |
| JP | H07192112 | 7/1995 |
| JP | 2005321935 A | 11/2005 |
| JP | 2007213148 A | 8/2007 |
| JP | 2008021082 A | 1/2008 |
| JP | 2010146158 A | 7/2010 |
| JP | 5278978 B2 | 5/2013 |
| KR | 20010016395 A | 3/2001 |
| KR | 20120009654 A | 2/2012 |
| WO | WO2005086616 A2 | 9/2005 |
| WO | WO2006038114 A1 | 4/2006 |
| WO | WO2007028799 A1 | 3/2007 |
| WO | WO2007031176 A1 | 3/2007 |
| WO | WO2007071788 A1 | 6/2007 |
| WO | WO2007090437 A1 | 8/2007 |
| WO | WO2007144598 A1 | 12/2007 |
| WO | WO2009030853 A1 | 3/2009 |
| WO | WO2009089126 A1 | 7/2009 |
| WO | WO2009115611 A2 | 9/2009 |
| WO | 2010018646 A1 | 2/2010 |
| WO | WO2010018464 A2 | 2/2010 |
| WO | WO2012145842 A1 | 11/2012 |
| WO | 2013051019 A1 | 4/2013 |
| WO | WO2013126221 A1 | 8/2013 |
| WO | WO2013173408 A1 | 11/2013 |
| WO | WO2015004434 A1 | 1/2015 |
| WO | 2016081755 A1 | 5/2016 |
| WO | WO2016081831 A1 | 5/2016 |

OTHER PUBLICATIONS

Farid, "Digital Image Forensics," Dartmouth CS 89/189, Sprint 2013, 199 pages.

Huang et al., "A Novel Binarization Algorithm for Ballistic Imaging Systems," 3rd International Congress on Image and Signal Processing, Yantai, China, Oct. 16-18, 2010, pp. 1287-1291.

Huang et al., "An Online Ballistics Imaging System for Firearm Identification," 2nd International Conference on Signal Processing Systems, Dalian, China, Jul. 5-7, 2010, vol. 2, pp. 68-72.

Li, "Firearm Identification System Based on Ballistics Image Processing," Congress on Image and Signal Processing, School of Computer and Information Science, Faculty of Computing, Health and Science Edith Cowan University, Mount Lawley, WA, Perth, Australia pp. 149-154.

Online NCOALink® Processing Acknowledgement Form (PAF) Released by Lorton Data, Jun. 2, 2009, URL=http://us.generation-nt.com/online-ncoalink-processing-acknowledgement-form-paf-released-by-press-1567191.html, download date Jun. 25, 2010, 2 pages.

Smith, "Fireball: A Forensic Ballistic Imaging System: Proceedings of the 31st Annual International Carnahan Conference on Security Technology," Canberra, Australia, Oct. 15-17, 1997, pp. 64-70.

United States Postal Service, "NCOALink® Systems," download date Jun. 23, 2010, 2 pages. URL=https://web.archive.org/web/20100724142456/http://www.usps.com/ncsc/addressservices/moveupdate/changeaddress.htm.

United States Postal Service Publication 28 "Postal Addressing Standards", dated Jul. 2008; text plus Appendix A only; 55 pages.

Boa et al., "Local Feature based Multiple Object Instance Identification using Scale and Rotation Invariant Implicit Shape Model," 12th Asian Conference on Computer Vision, Singapore, Nov. 1-5, 2014, pp. 600-614.

Beekhof et al., "Secure Surface Identification Codes," Proceeding of the SPIE 6819: Security Forensics, Steganography, and Watermarking of Multimedia Contents X:68190D, 2008. (12 pages).

Buchanan et al., "Fingerprinting documents and packaging," Nature 436 (7050): 475, 2005.

Di Paola et al., "An Autonomous Mobile Robotic System for Surveillance of Indoor Environments," International Journal of Advanced Robotic Systems 7(1): 19-26, 2010.

Fischler et al., "Random Sample Consensus: A Paradigm for Model Fitting with Applications to Image Analysis and Automated Cartography," Communication of the ACM 24(6); 381-395, 1981.

Kartik et al., "Security System with Face Recognition, SMS Alert and Embedded Network Video Monitoring Terminal," International Journal of Security, Privacy and Trust Management 2(5):9-19, 2013.

Li, "Image Processing for the Positive Identification of Forensic Ballistics Specimens," Proceedings of the 6th International Conference of Information Fusion, Cairns, Australia, Jul. 8-11, 2003, pp. 1494-1498.

(56) References Cited

OTHER PUBLICATIONS

Maddern et al., "Illumination Invariant Imaging: Applications in Robust Vision-based Localization, Mapping and Classification for Autonomous Vehicles," IEEE International Conference on Robotics and Automation, Hong Kong, China, May 31-Jun. 7, 2014, 2014, 8 pages.
Matsumoto et al., "Nano-artifact metrics based on random collapse of resist," Scientific Reports 4:6142, 2014 (5 pages).
Rublee et al., "ORB: an efficient alternative to SIFT or SURF," IEEE International Conference on Computer Vision, Barcelona, Spain, Nov. 6-13, 2011, 8 pages.
Schneider et al., "A Robust Content Based Digital Signature for Image Authentication," Proceeding of the International Conference on Image Processing Lausanne, Switzerland, Sep. 19, 1996, pp. 227-230.
Shi et al., "Smart Cameras: Fundamentals and Classification," Chapter 2, Belbachir (ed.), Smart Cameras, Springer, New York, New York, USA 2010, pp. 19-34.
Takahashi et al., "Mass-produced Parts Traceability System Based on Automated Scanning of Fingerpnint of Things," 15th IAPR International Conference on Machine Vision Applications, Nagoya, Japan, May 8-12, 2017, 5 pages.
Veena et al., "Automatic Theft Security System (Smart Surveillance Camera)," Computer Science & Information Technology 3:75-87, 2013.
United States Postal Services, NCOALink® Systems, dated May 27, 2009, URL=http://ribbs.usps.gov/ncoalink/ncoalink_print.htm, download date Jun. 23, 2010, 3 pages.
Ebay, "eBay Launches Must-Have IPhone App Red Laser 3.0" published Nov. 18, 2011; https://www.ebayinc.com/stories/news/ebay-launches-must-have-iphone-app-redlaser-30/, downloaded Mar. 21, 2019, 7 pages).
Shields, "How To Shop Savvy With Red Laser," published online on Mar. 22, 2010; https://iphone.appstornn.net/reviews/lifestyle/how-to-shop-savvy-with-redlaser/, downloaded Mar. 22, 2010, 8 pages.
Entrupy.com Website History, Wayback Machine; https://web.archive.org/web/20160330060808/https://www.entrupy.com/; Mar. 30, 2016 (Year: 2016), 5 pages.
Anonymous, "Intrinsic Characteristics for Authentication" & "AlpVision Advances Security Through Digital Technology," Authentication News vol. 12, (No. 9) pp. 2, 7 and 8, dated Sep. 2006, 3 pages total.
Mistry et al., "Comparison of Feature Detection and Matching Approaches: SIFT and SURF," Global Research and Development Journal for Engineering, vol. 2, Issue 4, Mar. 2017, 8 pages.
Woods, "Counterfeit-spotting truth machine launches out of Dumbo," published online on Feb. 11, 2016, downloaded from http://technically/brooklyn/2016/02/11/entrupy-counterfeit-scanner/ on Mar. 20, 2019, 3 pages.
Drew, M. S., et al., "Sharpening from Shadows: Sensor Transforms for Removing Shadows using a Single Image," Color and Imaging Conference, vol. 5, Society for Imaging Science and Technology, 2009, pp. 267-271.
Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.
Cavoukian et al.; "Biometric Encryption: Technology for Strong Authentication, Security and Privacy, Office of the information and Privacy Commissioner, Toronto, Ontario, Canada," 2008, in WE, International Federation lot Information Processing, vol. 261; Policies and Research in Identity Management; Eds. E. de Leeuw. Fischer-Hübner, S. Tseng, J., Barking, J.: (Boston: Springer), pp. 57-77 (21 pages).
Extended European Search Report Application No. 21153877.2, dated Jun. 15, 2021, 8 pages.
Schwabe Williamson & Wyatt, PC—Listing of Related Cases; dated Sep. 16, 2017; 2 pages.
Farid, Ahmed, et al., "Integrated fingerprint verification method using a composite signature-based watermarking technique", Optical Engineering, The Catholic University of America, (Year: 2007), 6 pages.
Jain, Anil K, et al., "Biometric Cryptosystems: Issues and Challenges", Proceedings of the IEEE, IEEE, New York, US, vol. 92, No. 6, Jun. 1, 2004, XP011112757, pp. 948-960.
Truong, Hieu C, et al., "Royal Canadian Mint/Signoptic Technologies Coin DNA Technology", World Money Fair (WMF) Berlin Feb. 1-3, 2011, http://www.amisdeleuro.org/upload/1340734488.pptx, 22 pages.
Extended European search report for European Application No. 21166869.4, dated Feb. 7, 2022, 9 pages.
Alpvision: "Intrinsic Characteristics for Authentication", Authentication News, Sep. 2006, vol. 12, No. 9, 3 pages.
Banafshe Arbab-Zavar et al., "On guided model-based analysis for ear biometrics", Computer Vision and Image Understanding, Academic Press, US, vol. 115, No. 4, Nov. 24, 2010, pp. 487-502, XP028153838.
Communication Pursuant to Rule 164(1) EPC, dated Feb. 2, 2022, for European Application No. 17166901.3, 5pages.
European Search Report dated Mar. 15, 2021, for corresponding EP Application No. 20202445.1, 8 pages.
European Search Report, dated Feb. 25, 2021, for European Application No. 20202130.9, 9 pages.
Extended European Search Report, dated Aug. 18, 2021, for European Application No. 21164207.9-17 pages.
Extended European Search Report, dated Aug. 18, 2021, for European Application No. 21164207.9, 13 pages.
Extended European Search Report, dated Aug. 19, 2021, for European Application No. 21164353.1, 9 pages.
Extended European Search Report, dated Jun. 18, 2021, for European Application No. 21153355.9, 8 pages.
Extended European Search Report, dated Nov. 10, 2021, for European Application No. 21179491.2-1207, 8 pages.
Extended European Search Report, dated Oct. 25, 2021, for European Application No. 21176644.9-1207, 11 pages.
Non-Final Office Action Issued in U.S. Appl. No. 16/553,943, dated Sep. 1, 2021, 13 pages.
Non-Final Office Action Issued in U.S. Appl. No. 16/752,593 dated Dec. 3, 2021, 55 pages.
Non-Final Office Action Issued in U.S. Appl. No. 16/783,126, dated Oct. 28, 2021, 29 pages.
Non-Final Office Action Issued in U.S. Appl. No. 16/825,270 dated Jan. 20, 2022, 29 pages.
Non-Final Office Action Issued in U.S. Appl. No. 16/827,701, dated Aug. 17, 2021, 19 pages.
Non-Final Office Action Issued in U.S. Appl. No. 16/866,468, dated Sep. 9, 2021, 24 pages.
Non-Final Office Action Issued in U.S. Appl. No. 16/867,506, dated Nov. 8, 2021, 14 pages.
Non-Final Office Action Issued in U.S. Appl. No. 16/872,202, dated Sep. 24, 2021, 14 pages.
Non-Final Office Action Issued in U.S. Appl. No. 16/903,323 dated Jan. 25, 2022, 13 pages.
Notice of Allowance dated Oct. 14, 2021, for Ritchey, "Object Change Detection and Measurement Using Digital Fingerprints," U.S. Appl. No. 17/189,470, 12 pages.
Notice of Allowance dated Oct. 7, 2021, for Ritchey, "Automated Authentication Region Localization and Capture," U.S. Appl. No. 16/866,468, 9 pages.
Yuetian Xu et al., "Robust object recognition using a cascade of geometric consistency filters", Applied Imagery Pattern Recognition Workshop (AIPRW), 2009 IEEE, IEEE, Piscataway, NJ, USA, Oct. 14, 2009, pp. 1-8, XP031677352.
Hensler, J., et al., "Hybrid Face Recognition Based on Real-time Multi-camera Stereo-Matching", ICIAP: International Conference on Image Analysis and Processing, 17th International Conference, Naples, Italy, Sep. 9-13, 2013, 10 pages.
Scott, Von Duhn, et al., "Three-View Surveillance Video Based

(56) References Cited

OTHER PUBLICATIONS

Face Modeling For Recognition", Biometrics Symposium, 2007, IEEE, PI, Sep. 30, 2007, 6 pages XP031202430.

\* cited by examiner
† cited by third party

FIG. 6 Sample Authentication Regions

CENTRALIZED DATABASES STORING DIGITAL FINGERPRINTS OF OBJECTS FOR COLLABORATIVE AUTHENTICATION

PRIORITY CLAIM

This application is a non-provisional of, and claims priority pursuant to 35 U.S.C. § 119(e) (2012) to U.S. provisional application No. 62/355,819 filed Jun. 28, 2016, hereby incorporated by reference as though fully set forth. This application is a divisional application of, and claims priority to U.S. utility application Ser. No. 15/635,040 filed Jun. 27, 2017.

COPYRIGHT NOTICE

COPYRIGHT © 2016-2020 Alitheon, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 C.F.R. § 1.71(d) (2017).

TECHNICAL FIELD

The present disclosure relates to the field of centralized databases storing digital fingerprints of objects that enable enhanced security, rapid searching, and collaborative authentication. Other aspects include methods and apparatus to identify, track, and authenticate physical objects utilizing a suitable database.

BACKGROUND

Many different approaches are known to uniquely identify and authenticate objects, including labeling and tagging strategies using serial numbers, bar codes, holographic labels, RFID tags, and hidden patterns using security inks or special fibers. All these methods can be duplicated, and many add substantial costs to the production of the objects sought to be protected. Physical labels and tags are also themselves at risk of being lost, stolen, or counterfeited.

SUMMARY OF THE PRESENT DISCLOSURE

The following is a summary of the present disclosure in order to provide a basic understanding of some features and context. This summary is not intended to identify key/critical elements of the disclosure or to delineate the scope of the disclosure. Its sole purpose is to present some concepts of the present disclosure in a simplified form as a prelude to a more detailed description that is presented later.

As stated above, there are many known approaches to establishing or reestablishing the authenticity of an object, including secure supply chains, expert assessment, and counterfeit detection. There are also many known ways by which stakeholders motivate or incentivize different actions or behaviors in a marketplace, such as by rebates and gifts. What is lacking, however, and is provided by the present disclosure, is the combination of authentication with a collaborative communication and incentive platform so that the authentication and incentivization are integrated into a single process or event in which an authentication action is inherent to the incentivized behavior.

Additional aspects and advantages of this disclosure will be apparent from the following detailed description of preferred embodiments, which proceeds with reference to the accompanying drawings.

BRIEF DESCRIPTION OF THE DRAWINGS

In order to describe the manner in which the above-recited and other advantages and features of the present disclosure can be obtained, a more particular description follows by reference to the specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF PREFERRED EMBODIMENTS

Figure 1A:
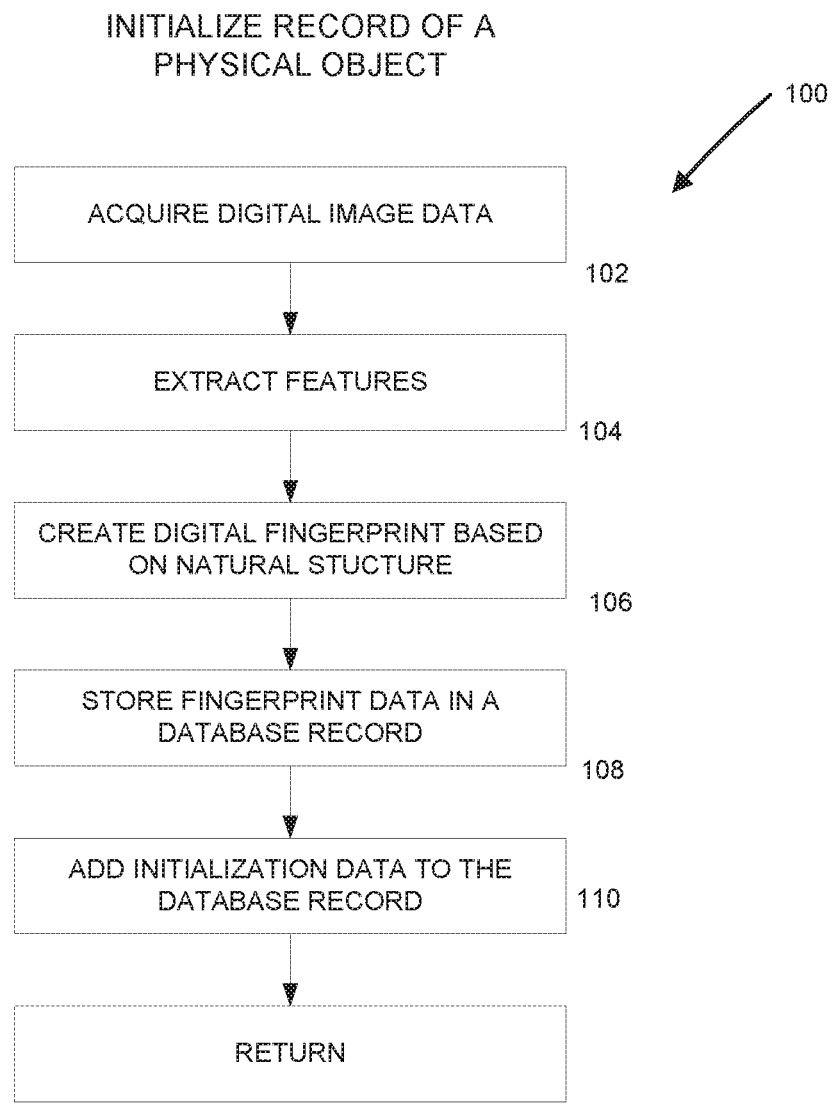
FIG. 1A is a simplified flow diagram illustrating a method for creating and recording a digital fingerprint of an object in a database.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first cellular network could be termed a second cellular network, and, similarly, a second cellular network could be termed a first cellular network, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The methods and systems described in the present disclosure enable the identification of an object without the need for attaching or associating physical tags or identifying materials with the object. A system does this by creating a unique digital signature for the object, which is referred to as a digital fingerprint. Digital fingerprinting utilizes the structure of the object, including random and deliberate features created during the manufacturing or use of the object, to generate a unique digital signature for that object similar to the way in which a human fingerprint references the friction ridges on a finger. Also, like a human fingerprint, the digital fingerprint can be stored and retrieved to identify objects when they are encountered at a later date.

Eliminating the need to add tags or any physical modifications to the object offers a number of advantages to manufacturers, distributors, sellers, and owners of goods. Forgoing the addition of physical identifiers reduces the cost of manufacturing and is more secure than physical tagging. Moreover, physical identifiers can be lost, modified, stolen, duplicated, or counterfeited whereas digital fingerprints cannot.

Unlike prior art approaches that simply utilize a comparison of pixels, a system in accordance with the present disclosure utilizes the extraction of features to identify and authenticate objects. Feature extraction enables users to take a large amount of information and reduce it to a smaller set of data points that can be processed more efficiently. For example, a large digital image that contains tens of thousands of pixels may be reduced to a few locations of interest that can be used to identify an object. This reduced set of data is called a digital fingerprint. This digital fingerprint contains a set of fingerprint features or locations of interest which are stored as feature vectors. Feature vectors make image processing more efficient and reduce storage requirements as the entire image need not be stored in the database, only the feature vectors need to be stored. Examples of feature extraction algorithms include but are not limited to edge detection, corner detection, blob detection, wavelet features, Gabor, gradient and steerable output filter histograms, scale-invariant feature transformation, active contours, shape contexts, and parameterized shapes.

While the most common applications of the system may be in the authentication of manufactured goods and documents, the system is designed to be applicable to any object that can be identified, characterized, quality tested, or authenticated with a digital fingerprint. These include but are not limited to mail pieces, parcels, art, coins, currency, precious metals, gems, jewelry, apparel, mechanical parts, consumer goods, integrated circuits, firearms, pharmaceuticals, and food and beverages. Here the term "system" is used in a broad sense, including the methods of the present disclosure as well as apparatus arranged to implement such methods.

Scanning

In this application, the term "scan" is used in the broadest sense, referring to any and all means for capturing an image or set of images, which may be in digital form or transformed into digital form Images may, for example, be two dimensional, three dimensional, or in the form of a video. Thus a "scan" may refer to an image (or digital data that defines an image) captured by a scanner, a camera, a specially adapted sensor or sensor array (such as a CCD array), a microscope, a smartphone camera, a video camera, an x-ray machine, a sonar, an ultrasound machine, a microphone (or other instruments for converting sound waves into electrical energy variations), etc. Broadly, any device that can sense and capture either electromagnetic radiation or mechanical wave that has traveled through an object or reflected off an object or any other means to capture surface or internal structure of an object is a candidate to create a "scan" of an object. Various means to extract "fingerprints" or features from an object may be used; for example, through sound, physical structure, chemical composition, or many others. The remainder of this application will use terms like "image" but when doing so, the broader uses of this technology should be implied. In other words, alternative means to extract "fingerprints" or features from an object should be considered equivalents within the scope of this disclosure.

Authenticating

In this application, different forms of the words "authenticate" and "authentication" will be used broadly to describe both authentication and attempts to authenticate which comprise creating a digital fingerprint of the object. Therefore, "authentication" is not limited to specifically describing successful matching of inducted objects or generally describing the outcome of attempted authentications. As one example, a counterfeit object may be described as "authenticated" even if the "authentication" fails to return a matching result. In another example, in cases where unknown objects are "authenticated" without resulting in a match and the authentication attempt is entered into a database for subsequent reference the action described as "authentication" or "attempted authentication" may also, post facto, also be properly described as an "induction." An authentication of an object may refer to the authentication of an entire object or of a portion of an object.

Authentication Regions

Because digital fingerprinting works with many different types of objects, it may be useful to define what regions of digital images of objects may be used for the extraction of features for authentication purposes. The chosen regions may vary for different classes of objects. In some embodiments a chosen region may be the image of the entire object; in other embodiments chosen regions may be one or more sub-regions of the image of the object.

For instance, in the case of a photograph, a digital image of the entire photograph may be chosen for feature extraction. Each photograph is different and there may be unique feature information anywhere in a photograph. In such a case, the authentication region may be the entire photograph.

In some embodiments, multiple regions may be used for fingerprinting. In some examples, there may be several regions where significant variations take place among different similar objects that need to be distinguished while, in the same objects, there may be regions of little significance. In other examples, a template may be used (see FIG. 6) to define regions of interest, including elimination of regions of little interest.

In one embodiment, an object, such as a bank note, may be deemed authenticated if a few small arbitrary regions scattered across the surface are fingerprinted, possibly combined with one or more recognitions of, for example, the contents of a region signifying the value of the bank note or one containing the bank note serial number. In such examples, the fingerprints of any region (along with sufficient additional information to determine the bank note value and its purported identity) may be considered sufficient to establish the authenticity of the bill. In some embodiments, multiple fingerprinted regions may be referenced in cases where one or more region may be absent from an object (through, for example, tearing) when, for example, a bank note is presented for authentication. In other embodiments, however, all regions of an object may need to be authenticated to ensure an object is both authentic and has not been altered.

Figure 6:
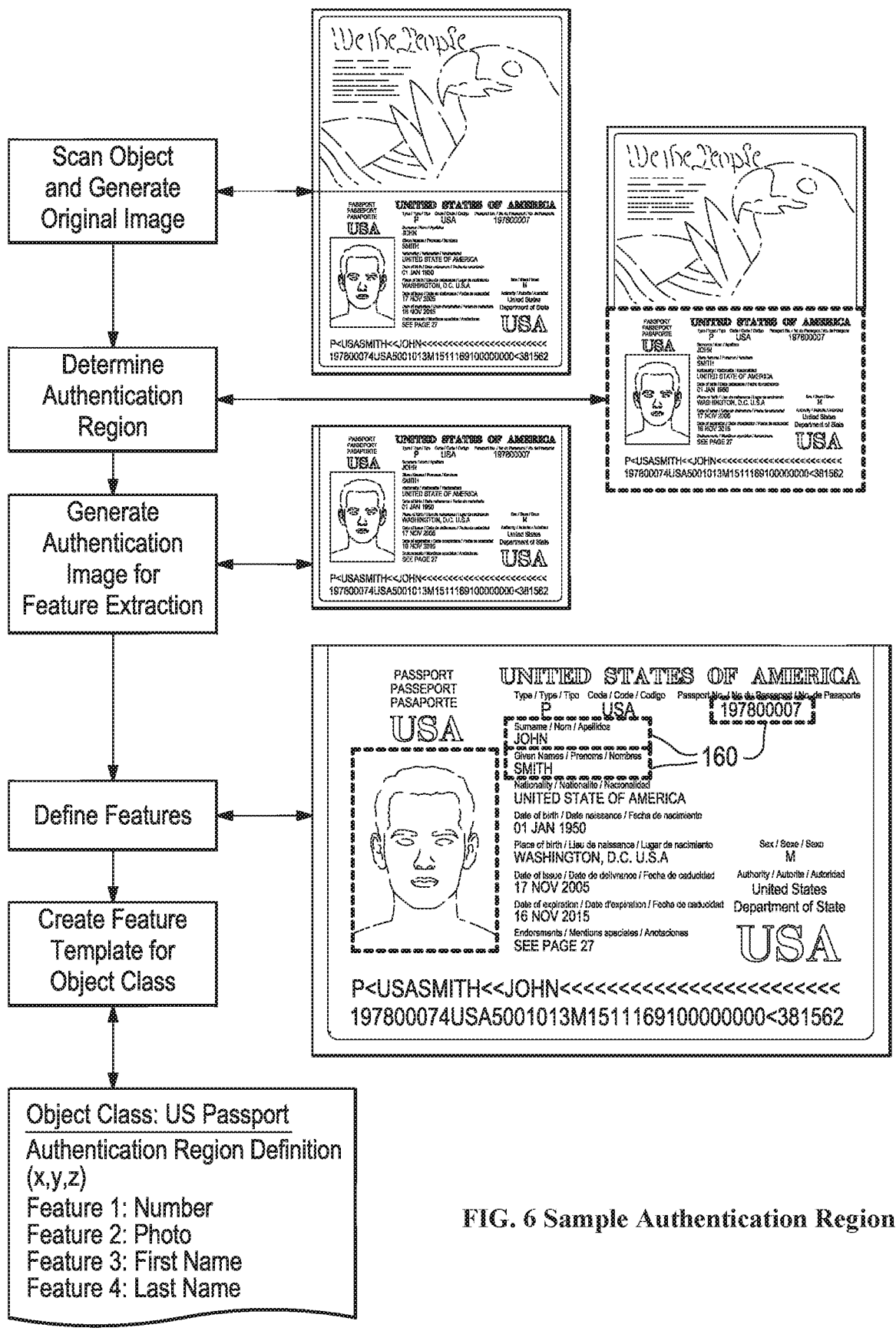
FIG. 6 illustrates an example of authentication region and object feature definition for a U.S. passport.

In one embodiment, a passport may provide an example of feature extractions from multiple authentication regions; see FIG. 6. In the case of a passport, features chosen for authentication may be extracted from regions containing specific identification information such as the passport number, the recipient name, the recipient photo, etc., as illustrated at reference number 160 in FIG. 6. In some examples, a user may define a feature template specifying the regions whose alteration from the original would invalidate the passport, such as the photo, identifying personal data, or other regions considered important by the user.

In some embodiments, an ability to define and store optimal authentication regions for classes of objects may offer benefits to a user. In some embodiments, it may be preferable to scan limited regions of objects rather than to scan entire objects. For instance, in the case of an article of designer clothing, scanning a clothing label may be preferable to scanning an entire garment. Further, defining such regions may enable detection of partial alteration of an object.

Once an authentication region is defined, specific applications may be created for different markets or classes of objects that may assist users in locating and scanning an optimal authentication region. In some embodiments, for example when utilizing a mobile device, a location box and crosshairs may automatically appear in the viewfinder of a smartphone camera application, to help the user center the camera on an authentication region, and automatically lock onto a region and complete a scan when the device is focused on an appropriate area. It should be noted that, although some examples suggested above are two-dimensional objects (passport, bank note), the present disclosure is fully applicable to three-dimensional objects as well. As previously noted, scanning may be of any kind, including 2-D, 3-D, stereoscopic, HD, etc. and is not limited to the use of visible light or to the use of light at all (as previously noted, sonar and ultrasound are, for example, appropriate scanning technologies).

In some embodiments, objects may have permanent labels or other identifying information attached to them. In addition to the objects themselves, these attachments may also be referenced as features for digital fingerprinting, particularly where the label or other identifying information becomes a permanent part of the object. In one example, a permanent label may be used as an authentication region for the object to which it is affixed. In another example, a label may be used in conjunction with the object itself to create a fingerprint of multiple authentication regions referencing both a label and an object to which the label is affixed.

In one example, wine may be put into a glass bottle and a label affixed to the bottle. Since it is possible that a label may be removed and re-applied elsewhere merely using the label itself as an authentication region may not be sufficient. In this case, the authentication region may be defined so as to include both a label and a substrate it is attached to—in this example some portion of a label and some portion of a glass bottle. This "label and substrate" approach may be useful in defining authentication regions for many types of objects, such as various types of goods and associated packaging. In other instances, authentication may reveal changes in the relative positions of some authentication regions such as in cases where a label has been moved from its original position, which may be an indication of tampering or counterfeiting. If an object has "tamper-proof" packaging, this may also be included in the authentication region.

In some embodiments, multiple authentication regions may be chosen from which to extract unique features. In a preferred embodiment, multiple authentication regions may be selected to enable the separate authentication of one or more components or portions of an object. For example, in one embodiment, features may be extracted from two different parts of a firearm. Both features may match the original firearm but since it is possible that both parts may have been removed from the original firearm and affixed to a weapon of different quality, it may also be useful to determine whether the relative positions of the parts have changed. In other words, it may be helpful to determine that the distance (or other characteristics) between Part A's authentication region and Part B's authentication region remains consistent with the original feature extraction. If the positions of Parts A and B are found to be consistent to the relative locations of the original authentication regions, the firearm may be authenticated. Specifications of this type may be stored with or as part of a digital fingerprint of an object.

Once a digital fingerprint of an object is acquired, a characterization of the object and corresponding fingerprint may be recorded in a database. For example, in some embodiments, a fingerprint may comprise one or more feature vectors. In some applications, the database may be secure. In some embodiments, a unique identifier or ID may be assigned to an object, for example in cases where an ID may be a convenient index in an application. However, an ID is not required since a digital fingerprint itself may serve as a key for searching a database. In other words, by identifying an object by the unique features and characteristics of the object itself, arbitrary identifiers, labels, tags, etc. are rendered unnecessary.

FIG. 1A is a simplified flow diagram illustrating a method 100 for creating and registering a digital fingerprint of an object in a database. The process, in one embodiment, includes acquiring a digital image data of the object, at block 102, as described above. A variety of scanning technologies and devices may be used as previously noted. Next, features are extracted, at block 104, from the digital image data. As above, specific features or regions of interest (authentication regions) may be selected in anticipation of subsequent identification or authentication attempts of an object. The extracted features are analyzed and feature vectors are extracted to form a digital fingerprint, indicated at block 106. The digital fingerprint may be stored in a database record. Other forms of searchable digital data storage should be deemed equivalents. Further, at block 110, initialization data may be added to the database record or associated with it in a related table. This data may be associated with the physical object that was scanned. This data may be, for example, a description, manufacturer, model number, serial number, contents, or any other data deemed appropriate or useful for the object or a class of objects.

Figure 1B:
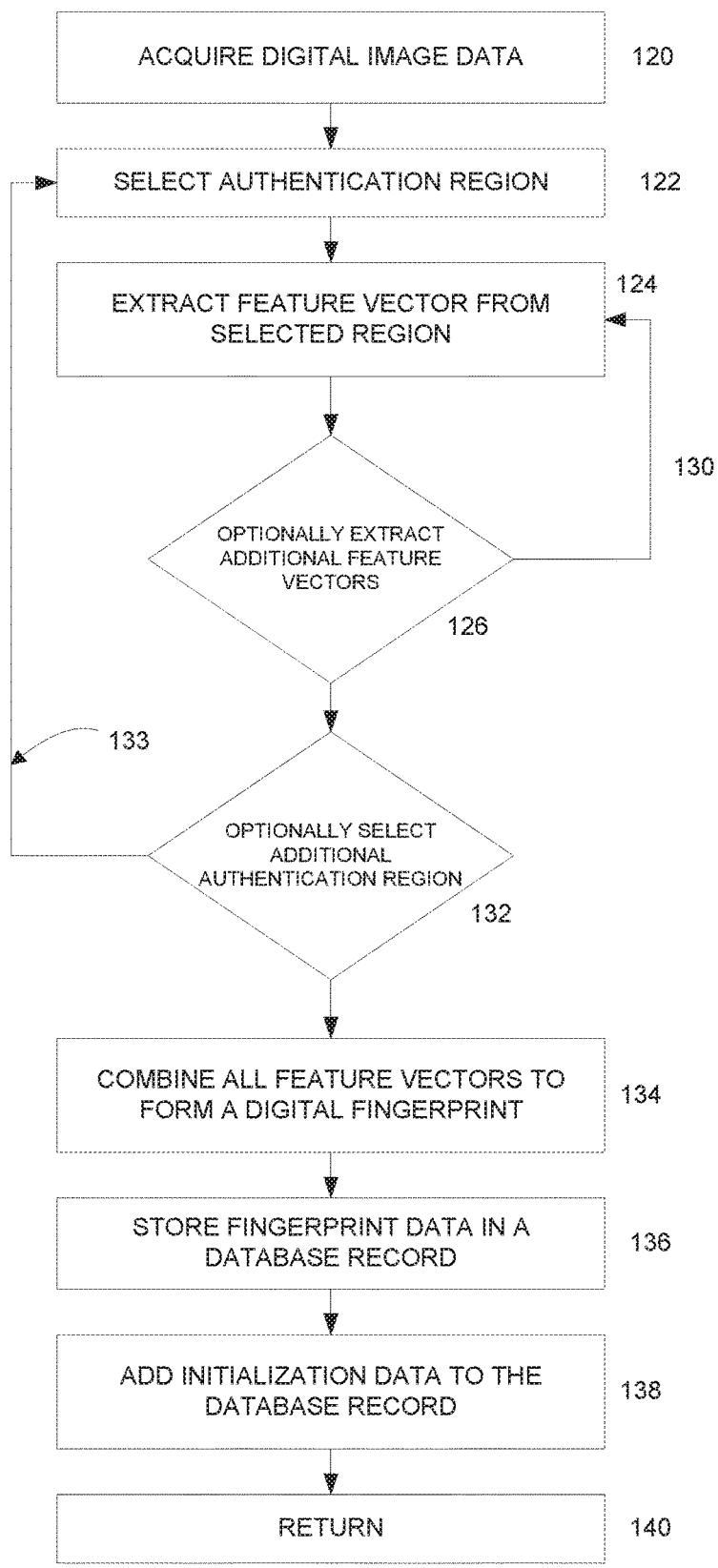
FIG. 1B illustrates an example of an alternative process for feature extraction.

FIG. 1B illustrates an example of a process that includes more robust feature extraction. In one embodiment, the process similarly begins with acquiring digital image data, at block 120. At least one authentication region is selected, at block 122. This may be done by analysis of the image data, analysis of related image data, by reference to a predetermined template that defines at least one authentication region, or other means. The next block 124 calls for extracting a feature vector from a selected authentication region. A feature vector may be used to represent features of a region in a more compact form. In some examples, a feature vector may comprise an array of color or gray scale numeric values corresponding to areas within the selected authentication region. The values may each comprise a sum, average, maximum, or other function of the individual values of a corresponding group of pixels forming a sub-part of the region. In some embodiments, a feature vector may identify a location and shape of a distinctive aspect within a selected region. In decision 126, there may be additional feature vectors to be extracted from the same image data. In that case, the flow returns, path 130, to repeat the feature extraction block 124. The loop comprising block 124, path 130, and decision 126 may repeat until all desired feature vectors are collected. Optionally, there may be another authentication region to process in the same image data, see decision 132. In that case, path 133 is traversed back to block 122 for further feature extraction with respect to one or more additional authentication region. Then some, or all, of the extracted feature vectors may be combined to form a digital fingerprint, block 134, which is then stored in a database record, block 136, along with related data, block 138, as mentioned above. The process returns or concludes at block 140.

A database of digital fingerprints may form the basis of a system to identify or track an object in a supply chain, distribution network, sales channel, or any other series of locations, ownerships, or possessions. An identification system based on digital fingerprinting has unique advantages and capabilities that are not available with identification systems based on currently available methods.

Current identifiers such as holograms, bar codes, and serial numbers may all be duplicated (or otherwise counterfeited) with varying degrees of effort. Because such identifiers are vulnerable to diversion and counterfeiting, a counterfeit object with a duplicated identifier—and counterfeit objects with otherwise counterfeited identifiers—may enter a supply chain or distribution network. The counterfeit identifiers may subsequently be registered in a conventional identification or track-and-trace system. All current identification systems rely on determining whether the identifier (label, hologram, RFID tag) is legitimate, not whether the object itself is legitimate.

Due to this weakness, identification and tracking systems based on conventional approaches like bar codes or serial numbers cannot prevent counterfeit objects from entering a supply chain or prevent the resulting corruption of the system database. A counterfeit object may be mistakenly identified as genuine and generate a false audit trail as it is identified through the supply chain. Two or more objects with the same ID (one genuine, one or more counterfeit) may exist at the same time without detection. Without physically examining the objects it may be impossible to tell which object is genuine and, depending on the quality and origin of the counterfeits, even physical examination of an object may be insufficient to determine its authenticity.

Once a counterfeit object has been detected in a conventional system, false audit trails must be removed from the system database to restore integrity. This may be difficult depending on the structure of the database and the complexity of the identification data. In some cases, the objects may not have any further contact with a system (for instance if they are purchased by a consumer), and the record will never be identified as false, leaving the database permanently corrupted.

In some embodiments of the present disclosure, an object may be scanned and identified at initial manufacture. Alternatively, an object may be scanned and identified at any subsequent time or location for entry into a database. Preferably, the scanning and identification is carried out when an object is either in the possession of its manufacturer or has been transferred by secure means to the point of scanning so that its legitimacy at the point of identification may be adequately established. However, this is not necessary and the adequate legitimacy of an object may be established through various other means both prior to or following induction.

Figure 2:
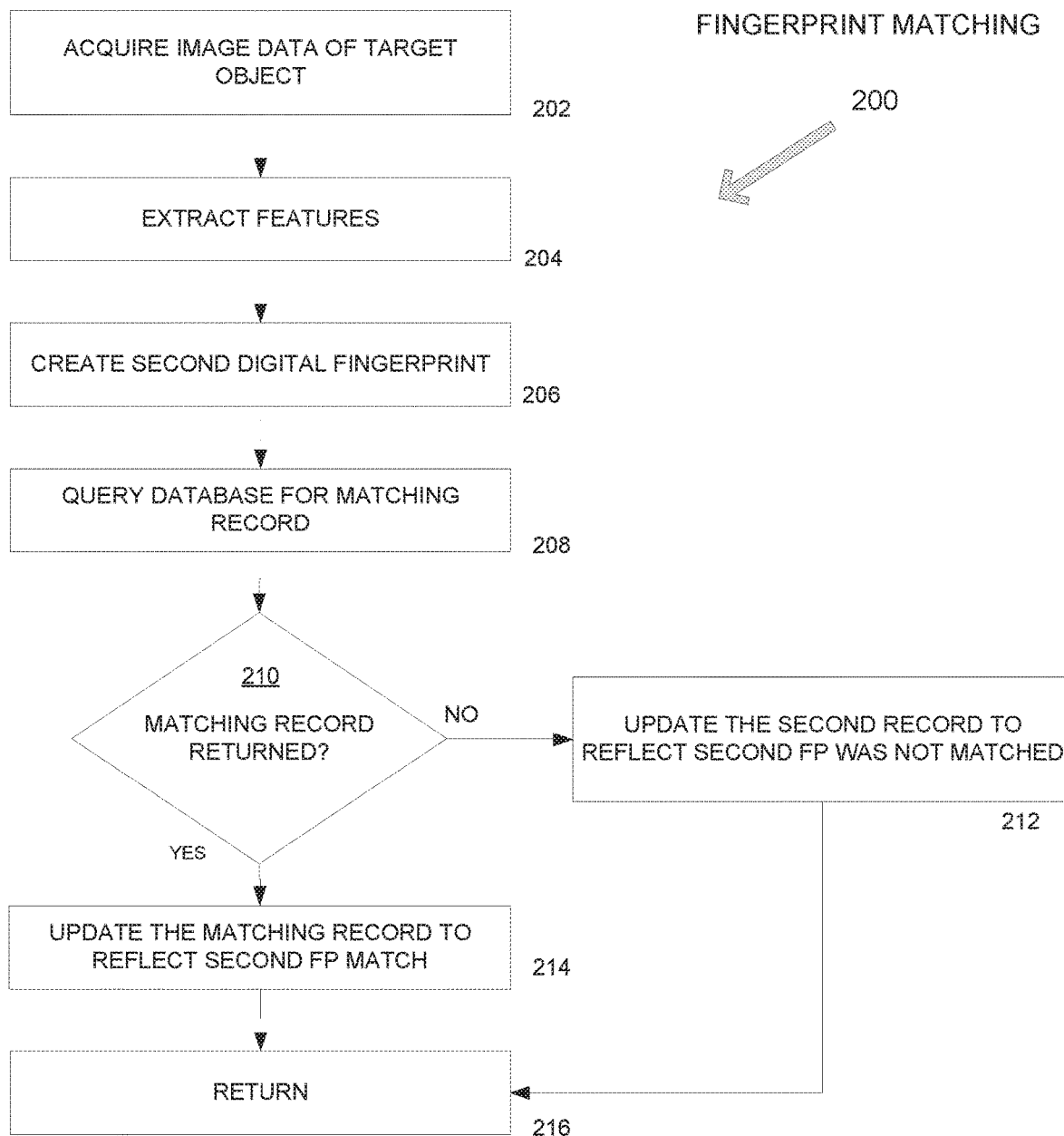
FIG. 2 is a simplified flow diagram illustrating a method for matching a digital fingerprint of a target object to a database of existing digital fingerprints.

In an embodiment, the system subsequently identifies the scanned and identified object every time the object is scanned again, typically at discrete steps in manufacturing, distribution, and sale, and as part of a data collaboration scheme. FIG. 2 is a simplified flow diagram illustrating a method 200 for matching a digital fingerprint of a target object to a database of existing digital fingerprints. Block 202 shows acquisition of the image data of a "target object" i.e., the object sought to be identified or authenticated by returning a match in the database. Features are extracted from the target object image data at block 204, as discussed above. A new (second) digital fingerprint record is created based on the extracted features at block 206. The next step is querying the database, block 208, for a record that matches the second digital fingerprint record. "Matching" in this context may reflect a threshold confidence level rather than a binary decision. The requisite confidence level may vary depending on the specific application. The confidence level required may be varied dynamically responsive to the data and experience with a given system. If no "matching" record is returned, decision 210, the second digital fingerprint record (the digital fingerprint ("FP") of the target object), block 212, may be updated to reflect that no match was returned. If a match is returned, the matching record may be updated to reflect the match, for example, it may be linked to the second record. The results may be returned to the user.

Figure 3:
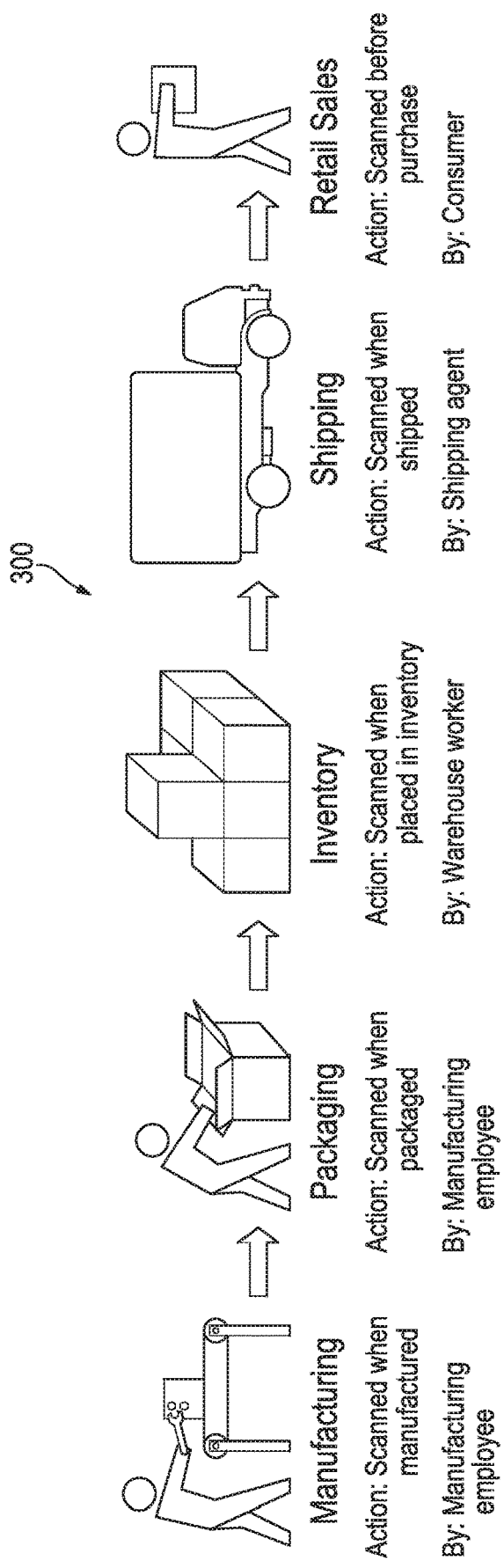
FIG. 3 is a simplified conceptual diagram showing a method for scanning of an object at various times and places along a manufacture and distribution chain.

Examples of scanning locations might include scanning at a point of manufacture, when packaged, when placed in inventory, when shipped, and at a retail point of sale (e.g. upon arrival and again when sold), as illustrated in the tracking process 300 of FIG. 3. Scans may take place as a part of a data collaboration scheme. Each scan may be used to update a remote database.

As previously described, a "scan" may refer to an image (or to digital data that defines an image) captured by a broad range of capturing devices. In an embodiment, a scan of an object may capture both features of the object and features of an identifier that has been attached to the object. Feature vectors extracted from authentication regions located on an attached identifier are based on the substances of which the identifier is physically comprised rather than the information (typically alphanumeric) that is intended to be communicated by the identifier. For instance, in the case of a wine bottle, features may be captured from the bottle and from a label affixed to the bottle. If the label includes a standard UPC bar code, the paper of the label and the ink pattern of the bar code may be used to extract a feature vector without reading the alphanumeric information reflected by the bar code. An identifier, such as a UPC bar code print consisting of lines and numbers, has no greater significance in the creation and use of a feature vector than a set of randomly printed lines and numbers.

Figure 4:
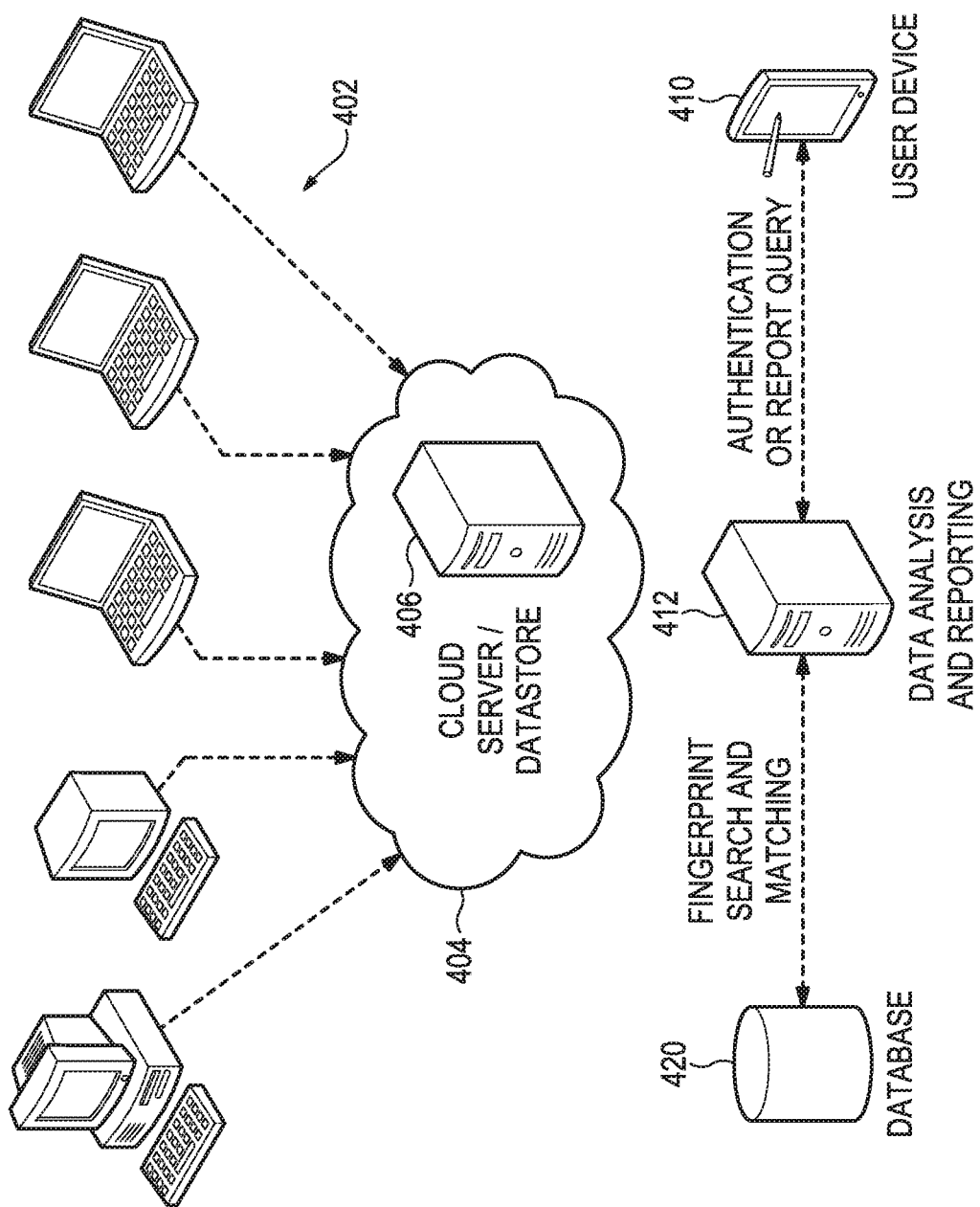
FIG. 4 is a simplified conceptual diagram illustrating an example of the use of a mobile device application to query authentication information related to an object.

FIG. 4 is a simplified conceptual diagram illustrating an example of the use of a mobile device application to query authentication information related to an object. Here, various computing devices or terminals 402 may have access over a network, for example, the internet 404, to cloud computing facilities or services such as a cloud server or other datastore 406. For example, devices 402 may be located at various points along a distribution chain as illustrated in FIG. 3, each location scanning an object and updating a cloud server or other datastore 406.

A server 412 may be provisioned to provide identification and/or tracking data analysis and reporting. The server 412 has access to a database 420 which may be used to store digital fingerprints and related data. The server can query or search the database 420 for digital fingerprint search and matching. The database 420 is preferably coupled to the cloud server 406 in some embodiments. A mobile user device 410 such as a smartphone, tablet, laptop computer, or dedicated device may be configured for communications with the server 412 to request and receive a reply or authentication report for an object of interest. This architecture is simplified and in any event is merely illustrative and not intended to be limiting.

In some embodiments, sensors may be attached to the object, and sensor data can flow back to the database in either a continuous fashion (near real time), or in discrete data transfer events. For example, data transfer may occur when an authentication event occurs. For instance, if there is a GPS chip attached to the object, data flow can start when the object is first registered in the system and continue to flow as the object changes location. Continuous or intermittent data updates may also be buffered in local memory in a sensor attached to an object, and then downloaded the next time the object is scanned and authenticated. This example provides an itinerary record of where the object has traveled.

As an example of the potential uses of sensor data, many products like food and beverages can degrade with exposure to certain environmental factors during storage and shipment. Examples of sensor data could include temperature, humidity, light exposure, altitude, oxygen level, or other factors, as well as location such as GPS data.

Figure 5:
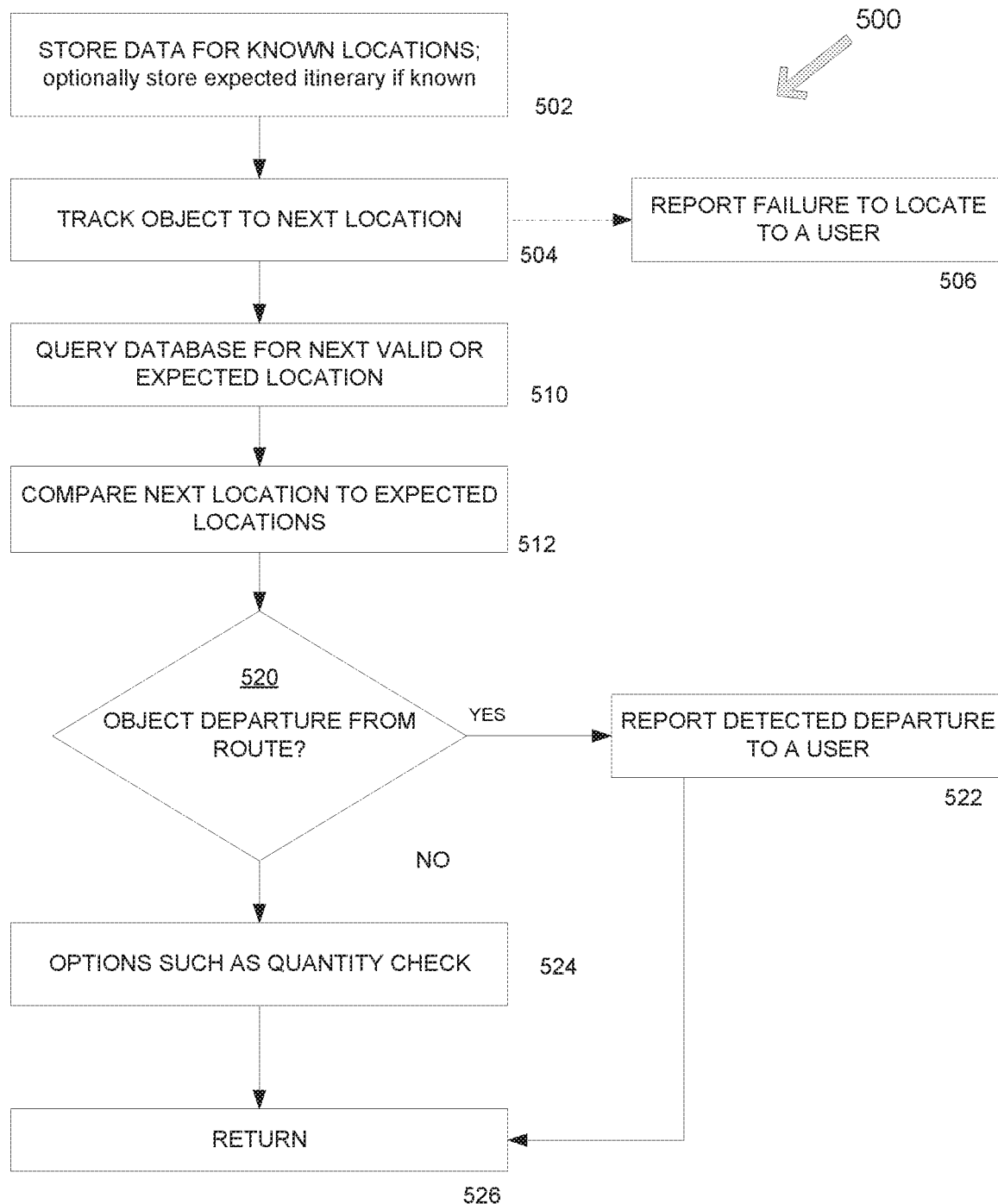
FIG. 5 is a simplified flow diagram illustrating a method for tracking an object to verify its provenance.

FIG. 5 is a simplified flow diagram illustrating one embodiment of a process 500 for identifying an object to verify its provenance. Here, an expected itinerary of an object (a series of locations) may be stored in a datastore if known, block 502. The methods and systems described above may be used to track the object to the next location, block 504. If the object does not arrive as expected (where and when expected according to the itinerary), the failure may be reported to a user. In an embodiment, an object that arrives later than expected may be subjected to closer matching scrutiny to ensure its identity.

The next step, block 510, is to query the database for the next valid or expected location. A unique itinerary may not be known, but a set of valid or expected locations may be known. The next actual location of the object (as determined by imaging and matching digital fingerprints) may be compared to the expected location(s) returned by the database, block 512. If that comparison indicates a departure from the expected or authorized route, decision 520, the result may be reported to a user, block 522. (A report that the object is on track may be reported as well.) Other options may be implemented such as a quantity check, block 524. The process returns or terminates at block 526.

Most existing identification systems are designed only to be accessed by manufacturers or their authorized distributors, and some require specialized scanners or equipment. However, consumers also have a vested interest in determining whether the items they are buying are authentic. Other parties may also have an interest in determining the authenticity of an object, for example, in response to offered or future incentives for object data collection. In some embodiments, the present system is designed to enable anyone along the supply, distribution, or sales chain, from manufacturer to the retail consumer or other members of the public, to access the system and determine whether the object is authentic. A specialized scanner is not required in all cases. For example, in one embodiment a mobile phone application designed for public use can be employed to scan an object, query the database, and determine if the object is authentic.

Finally, data collected by a digital fingerprinting system offers a variety of useful information to stakeholders along the supply, distribution, and sales chain. Reports can be generated on individual objects, or on sets of objects. These reports can include, but are not limited to, the locations of objects over time, audit trails, points of entry of counterfeit goods, and exposure to environmental variables over the course of an object's lifetime.

Tags and Bar Codes

In some instances, an identifier such as a tag or a label may be considered a useful addition to an object, mainly for two reasons. The first main reason is that a human may need to reference it for information. For example, a tag or a label may inform a store clerk as to the particular style and size of a piece of clothing by a particular manufacturer, or it may tell a postal carrier the address to which a mail piece should be delivered. The second main reason has to do with the employment of machine-readable tags, for example when an Intelligent Mail Barcode on a mail piece (unreadable by humans) is used to route the mail piece by machine. The entire class of existing machine-readable tags can be replaced by the methods of the present disclosure. In some instances, tags or labels may still be needed for human information but they are unnecessary for the purpose of authentication or any machine-readability functions.

Because digital fingerprinting exploits natural features and often involves scanning an object under variable conditions, it is highly unlikely that two different scans will produce the exact same fingerprint. As a result, an ability to look up objects in the database when there is a "near-miss" is included. In one example, two feature vectors [0, 1, 5, 5, 6, 8] and [0, 1, 6, 5, 6, 8] are not identical but, given a certain difference metric, they may be close enough to conclude, with a level of certainty, that they are from a certain object that has been scanned before. This is particularly true if, otherwise, the nearest feature vector of a different object is, for example, [5, 2, 5, 8, 6, 4]. For example, a distance between vectors of n-dimensions may be calculated and used as one metric of similarity or "closeness of match" between two or more vectors. The distance to the next nearest candidate may also be considered.

Global vs. Regional Feature Matching

In some embodiments, where we have an original document or other object fingerprinted, the digital fingerprinting techniques allow region-by-region matching, making apparent which (if any) regions have changed from the original. Thus, for example, a good overall match on a passport may be achieved but if none of the matches happen in the photograph it becomes apparent that the photograph has likely been changed. Further, if some individual or group, say a known terrorist group, has a certain pattern or regularity to altering passports—such as to change the photo, the date of birth, and one digit of the passport number—then this ability to find altered regions may also provide the ability to discern a pattern of changes that may be used to identify a "signature" modus operandi of a particular counterfeiter. Thus aspects of digital fingerprinting may be applied not only to detect a forged or altered object, but may also be used to identify a counterfeiter or otherwise discover the source of an altered object.

Authenticated Data Collaboration

Incorporating digital fingerprint-based authentication in collaborative communication and incentive platforms allows users to refer to objects based on their authentication and induction events. By combining digital fingerprinting and data collaboration in one process, parties to the data collaboration can gain a level of certainty that data attributed to an object by different parties or at different times is attributed to only that object and not erroneously attributed to an incorrect or counterfeit object. Using presently available technology, such certainty may not be achieved without carrying out a separate authentication process, and, even with such a process, the presence of counterfeits may still go undetected for the reasons already elaborated on. The integration of authentication and data collaboration removes the need for a secondary authentication processes and ensures that data associated with a certain object is associated with only that one particular object and not erroneously associated with a different object, including a counterfeit object.

In a preferred embodiment, an attempt to authenticate an object consists of scanning at least a part of the object; forming a digital fingerprint from image data that is derived from the object itself and does not rely upon reading or recognizing information from labels, tags, integrated materials, unique identification characters, codes, or other items that were added to the object for the purpose of identification; querying a database of stored fingerprints of known-authentic objects, and getting a result that indicates whether the digital fingerprint matches a digital fingerprint stored in the database.

In a preferred embodiment, one or more such authentication attempts are performed as an integrated part of a collaborative scheme in which incentives relating to known and unknown physical objects are created by a stakeholder and dispersed to one or more users who attempt authentication in an effort to receive authentication-related incentives. Such integration of authentication and data collaboration removes the need to separately verify the authenticity of an object of interest (or a portion of an object of interest) to ensure that collaborative data collected by stakeholders or other users is properly associated with the object of interest and not wrongly associated with other objects or counterfeits of the object of interest. Further, such integration of authentication may be used to preclude improper assessment of incentives. Incentives may be created by a stakeholder, who is any person, user, or entity that has an interest in an object or class of objects or in the occurrence of an authentication attempt of a known or unknown object (or class of known or unknown objects).

The method may further include attempting to authenticate a second object to obtain a second result; and, based on a combination of the two authentication results, adjusting the incentive outcome.

In one embodiment, the digital fingerprint may be used to confirm: a) the authenticity of an object; b) information from existing serialization or labels (if present); and c) their association with each other. The use of digital fingerprinting therefore provides a means to offer incentives related to actions for specific objects without relying on existing serialization but at the same time allowing for the incorporation of serialization data when such incorporation is desired.

Creating and dispersing incentives for behaviors related to authentication and induction of one or more physical items (through various means mentioned herein) may be used to motivate users to collect additional, relevant data, which enriches the value of the authentication database. Incentive schemes may empower and/or incentivize users within a network to use their local resources, such as an internet-connected smartphone with a suitable smartphone application, to collaboratively share object inductions and authentications as well as any desired contextual or transaction-related data. The act of authentication or induction by a distributed and potentially diverse set of a plurality of devices or processors provides the opportunity to use and expand an existing database or datastore to detect, infer, model, or estimate data trends, such as the likelihood of counterfeit or diverted goods. Authenticated data collaboration provides the means for collecting and assembling information related to, for example, the supply chain path or traceability of an object. Thus, authenticated data collaboration creates a novel synthesis of several processes: induction and authentication of objects, collection and distribution of data and metadata to stakeholders, in-field data gathering, and an incentive scheme to encourage action.

Moreover, there are network effects gained from using authenticated data collaboration since all induction or authentication attempt data may be useful. Each authentication potentially enriches the system data set and provides more value to stakeholders, such as brand owners and governmental agencies. More data means stakeholders have a better mechanism for traceability to expose weaknesses in their supply chain.

In addition to potentially rewarding the user, both matches and non-matches may be coupled to various other processes within the system. Among such processes may be requests to a user to gather additional data, the adjustment of a new or existing incentive scheme, the issuing of alerts to stakeholders and/or authorities regarding counterfeit goods or other items of concern, and more.

Collaborative authentication provides a means to motivate users to collect data on any physical item of interest.

This approach, but not traditional authentication approaches, enables user-based authentication, in-field data collection, and stakeholder notification and interaction—and may be performed whether or not an object is counterfeit and applied both to object and sub-object-level granularities. An example of sub-object-level application could be the authentication of individual chips on a circuit board.

In a preferred embodiment, authentication-based data collaboration may be used to expand counterfeit-detecting forensics—traditionally carried out by a lab or specialized individuals—to include "crowd-sourced" counterfeit detection by any able user. For example, users may gather and contribute data relating to the distribution of both legitimate and counterfeit items as well as additional indicators or evidence of counterfeiting activity, including data that can be captured by use of device and application as well as other data or media, such a video and audio files, which may be used in the context of counterfeit claims, or to gain other contextual understanding related to a supply chain. Crowd-sourcing of counterfeit detection may provide brands and/or legal agencies with information and data which may be used in activities such as locating counterfeits, assessing threats, and analyzing trend data.

Incorporation of authentication by digital fingerprinting to forensic-related data collaboration enables a higher standard of user-collected forensics as described herein than the standard current authentication techniques. The difference is illustrated by the following example in which authentication by QR code is compared with authentication using digital fingerprinting. A user has a wine bottle before him with a QR code on it. The user images the QR code using a smartphone application and is confronted with the following three possibilities: 1) the user may have a legitimate bottle of wine with a legitimate QR code on it, 2) the user may have a counterfeit bottle of wine with a functional copy of a legitimate QR code on it, or 3) the user may have an authentic or a counterfeit bottle of wine with a non-functioning QR code on it.

In the first case where both the QR code and the bottle are authentic, the application may read the QR code, open a communications channel with the brand owner, present the customer with the information that the item contains a legitimate QR code (and hence is presumed to be a legitimate item), as well as information of the item.

In the second case where there is a copy of a legitimate QR code on a counterfeit bottle, exactly the same thing happens and, unless the real bottle (or another functional copy of the QR code) has already been authenticated by the system, there is no way to tell the customer or the brand owner that the bottle is, in fact, counterfeit. Both the user and the brand owner are, in fact, led to believe that the authentication process has been successful.

In the third case where there is a non-functioning QR code, the customer knows immediately that the QR code is counterfeit, because it does not authenticate. However, that information may not be conveyed to the brand owner as part of the authentication process. The user is also unable to find out whether the counterfeit QR code is attached to a real or a counterfeit bottle as the authentic QR codes may, for example, have been fraudulently moved to counterfeit bottles and the authentic QR codes on the authentic bottles may have been replaced by counterfeit or duplicate QR codes by a bad actor, which leaves open the possibility that authentic bottles may carry counterfeit QR codes and counterfeit bottles may carry authentic QR codes.

To contrast, consider what happens where the authentication is based on digital fingerprints. In an embodiment, a user is offered an incentive, such as a potential discount, for authenticating one or more objects in a store or other location and, optionally, to capture additional object-related data. The user scans several objects, such as wine bottles, and transmits the authentication and additional data, if any, to the database.

Because collaborative authentication comprises authentication that involves digital fingerprinting, identifying information sent to the database is inherent in the object itself instead of, as in the earlier example, an applied QR code. Moreover, the use of digital fingerprinting authentication allows additional relevant data, such as sensor data, to be incorporated in the authentication event, and the matching result may be coupled with the use and/or distribution of incentives for any authentication-related activities.

Authenticating an inducted object using digital fingerprints and obtaining a matching result provides users with a high confidence level when it comes to the legitimacy of an object. The high level of confidence in the authenticity of a digitally fingerprinted object is a distinction from the traditional QR-based approach: digital fingerprints authenticate the unique physical signature of the item itself; the traditional approach in the earlier example merely authenticates the QR code, which is additive and used as a proxy for authentication of the wine bottles. The level of confidence is therefore not in the authenticity of the product but more appropriately in the authenticity of the QR code. By contrast, confidence in the authenticity of a digital fingerprint is the same as confidence in the authenticity of the digitally fingerprinted object since, unlike the QR code, the two cannot be separated.

In addition, a non-matching result in the context of digital fingerprinting authentications offers users many potential benefits which applied identifiers cannot. As an example, in cases of counterfeit objects, applied QR codes are limited in that a non-matching result merely reveals to the user that a code is not valid or that there may be a legitimacy issue with the code, the object, or both. Conversely, in cases where digital fingerprint authentication of a counterfeit object is attempted and a non-matching result is returned, the authenticity of the fingerprint and object is not only immediately apparent but the system may nevertheless enter the digital fingerprint of the counterfeit object in the database, along with all its additional data and metadata, where it may be accessed, for example, for informational, analytical, or evidentiary purposes. Non-matching digital fingerprint results may also be used to alert stakeholders and authorities to the presence of counterfeit objects. Moreover, a non-matching digital fingerprint result that is saved in a datastore is in fact its own object induction, to which later authentication attempts may be matched. This allows a counterfeit object encountered by a user to be verified at a later point in time, for example by law enforcement, or to be collected into a database of known or suspected counterfeits for future reference or use. Digital fingerprinting therefore allows for a much broader application than a QR code system that is limited to recognizing its own QR codes.

The above examples illustrate the inherent unreliability of affixed identifiers, such as QR codes. Further, the examples show that affixed identifiers not only fail to prevent counterfeiting but may in fact incentivize additional counterfeiting activities related to the products they are designed to protect as the use of such identifiers necessarily incorporates an incentive for the counterfeiting market to create and use counterfeit identifiers to prevent loss of market share. Digital fingerprints, by contrast, cannot by their nature be removed from the object which they reference nor may they be affixed to a different object than the one originally referenced in their creation. Additionally, whereas an authentic identifier such as a QR code, even when the QR code is unique, may be duplicated and affixed to multiple objects a digital fingerprint may only ever be used in relation to the object whose features it references. Unlike any applied identifier, duplication of a digital fingerprint for use in context with an object that is not the object originally fingerprinted is simply not possible.

Data Enrichment

In an embodiment, each object in the database may be enriched by additional information provided by various users such as members or stakeholders of a multi-sided platform. In an example, when a user makes an authentication attempt, the attempt may provide data and metadata about the authenticated object using all available data collection vehicles (such as video, audio, or sensor outputs of temperature, GPS, accelerometer, etc.). Such information may be coupled with the identifying information of the object in a database or data store. Dataset enrichment through authentication tends to increase the value of data collected and encourage secondary efforts, which invites employment of an incentive scheme of encouragement to motivate activity.

Figure 7:
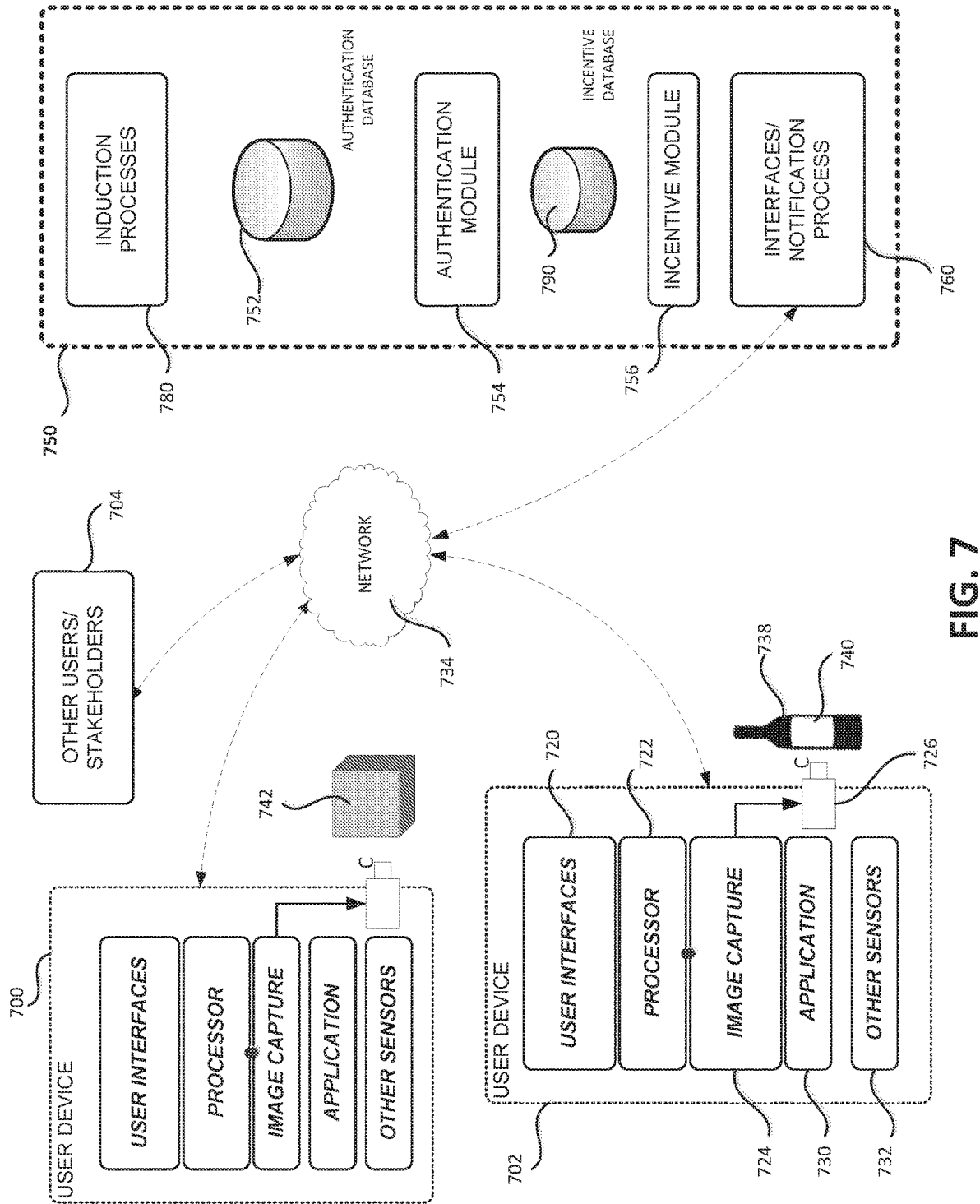
FIG. 7 is a simplified block diagram of aspects of an example system for implementing some embodiments of the present disclosure.

FIG. 7 is a simplified block diagram illustrating primary aspects of an example system for implementing some embodiments of the present disclosure. Here, multiple user devices 700, 702, also referred to as client devices, are shown. A client device 700 may be a computer, laptop, smart phone, tablet, or any other device or assembly, portable or fixed, that is capable of communications over a network (wired or wireless) and provides at least the other client device functionality discussed herein. Accordingly, a client device in an embodiment may include a user interface (or multiple user interfaces) 720 such as a keypad, touchscreen, audio, etc. A processor (or multiple processors) 722 provide various functions, as is known, including execution of one or often many applications programs or "apps" 730. As discussed elsewhere herein, one app may be designed to capture data and communicate it to a collaborative authentication platform 750. One example of an application process is given in FIG. 9.

In FIG. 7, the user device 702 includes a camera 726, which may be coupled to suitable image capture software 724. The camera should be suitable for image capture for generating digital fingerprints as described above. Fingerprints, based on captured image data, may be generated locally on the user device, or externally. In the latter case, the image data may be communicated over a network, illustrated as cloud 734. As one example, capture of an image of a wine bottle 738 is shown. More specifically, a typical image capture for authenticating a wine bottle would include a portion of the bottle that has a portion of the label overlying, for the reasons described above. The client device may have other sensors 732 such as GPS or a temperature sensor or altimeter. Various sensors may be used to provide supplemental data to an authentication database as described below. For example, additional data may be provided in the case of a non-match of a digital fingerprint to the database. Another object 742 is shown in view of a camera on the user device 700.

Further in FIG. 7, a collaborative authentication platform 750 is shown. In this illustration, not to be taken literally, the primary functional aspects and software modules of a platform are shown. The platform 750 may be implemented in any suitable digital computing system. In some embodiments, an induction process 780 may be used to initially populate an authentication database 752 with digital fingerprints and associated metadata of known authentic objects. The induction process may itself conduct induction (including scanning) of objects, or it may receive data from a remote induction resource. In one example, a user device could be used as an induction resource.

The authentication module 754 may provide various functions. It may serve as an interface or query engine to query the authentication database 753 in an attempt to authenticate or "match" digital fingerprint data to an existing record. In this function it may return a match result, as discussed. It may also serve to update or add data to the database 752 based on data received from collaborators as described above. For example, the module may add additional data to an existing record. The authentication database 752 may be local to the platform (as shown) or remote. In the latter case, the module 754 may interact with the remote database using known communication facilities and protocols, for example, over a network 734.

An incentive module 756, generally implemented in software, is provided in or operatively coupled to the platform 750. The incentive module 756 may provide several of the functions described above. For example, in an embodiment, it may interface with a remote user who may be a stakeholder relative to an object or a set of objects. (See further discussion of stakeholders below.) The stakeholder may utilize a client device 704 for communicating with the incentive module. The stakeholder may utilize the incentive module 756 to initiate a collaborative authentication project on the platform. A stakeholder who initiates a project may also be called a sponsor, or a "sponsoring stakeholder."

A project may identify the stakeholder, the object(s) of interest to the stakeholder, information sought to be obtained from collaborators (for example, object locations, temperatures, source of purchase, price, etc.) and the collaborative authentication project would identify one or more incentives to be offered to motivate collaborators. Other potential fields of interest for a project are shown in an example incentives database record in FIG. 11. Incentives are discussed in more detail below. A collaborator is assumed to have access to a client device such as 702 to enable collaboration operations. The incentive module 756 may also manage incentives, in terms of collecting them, distributing them to collaborators as appropriate, and in some embodiments tracking use of the incentives.

In some embodiments, the incentive module 756 may conduct analysis of a collaborative authentication project, for example, statistical analysis of the collaborators who participate, the data collected, and inferences to be drawn from the data. The module may generate a report regarding a project and transmit it to the sponsoring stakeholder. The module may make adjustments or "tune" the incentives for a given project based on the analysis (see FIG. 10). Finally, the platform 750 preferably includes interfaces and a notification process or module, 760. The interfaces may include a user interface, a network interface for communications, and other interfaces for external resources. A notification process, in some embodiments, may be used to send notification messages (or "request messages") to collaborators, or invitations to potential collaborators. For example, a process 760 may distribute notifications of the commencement of a new collaborative authentication project, and the particulars that collaborators need to know to participate in that project. The process may use an email list, social media, a web site or any other communications means.

Figures 8, 9:
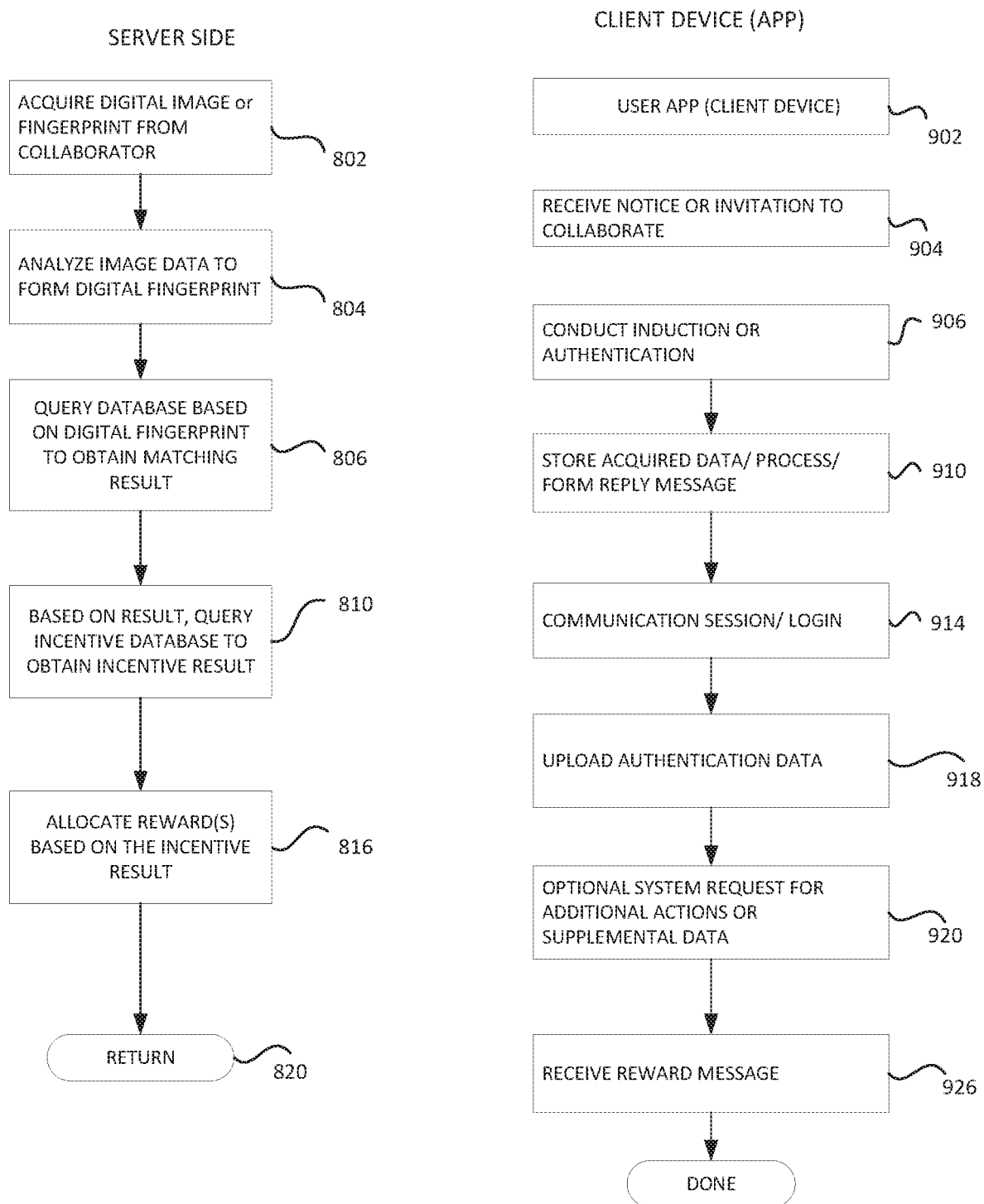
FIG. 8 is a simplified flow diagram of an example of a process for a collaborative authentication platform.
FIG. 9 is a simplified flow diagram of an example of a process for an application program for a collaborator to participate in collaborative authentication.

FIG. 8 is a simplified flow diagram of one example of a process for a collaborative authentication platform. In this illustration, a server or platform acquires digital image or fingerprint data from a collaborator, block 802. The collaborator may be responding to a request message it received from the platform. The request message may be part of a collaborative authentication project directed to multiple collaborators or potential collaborators. Next the process analyzes the acquired image data to form a digital fingerprint, block 804. In an alternative embodiment, the platform may receive digital fingerprints that require little or no additional processing. The process next queries a database of known authentic object fingerprints based on the acquired or "target" fingerprint data, block 806. The database returns a matching result. The matching result may indicate a match or no match. In some embodiments, the result may provide a confidence level of the result.

At block 810, in the case of a positive result indicating a match, the platform queries an incentive database to obtain an incentive result. For example, the incentive result may identify a reward. At block 816, the platform allocates the reward(s) based on the incentive result. Generally, the reward will be allocated to a collaborator who provided the matching target data, and otherwise met the terms and conditions of the request message or applicable collaborative authentication project. A collaborator may be an individual, a legal entity, a governmental entity, or a software entity or service under control of a person or entity. This process concludes at 820.

Data Collaboration Incentives

In an embodiment, a stakeholder may desire to motivate users to induct an object while it is in possession of a specific party. In one example, a user receives a geography-based notification based on proximity to an object or objects. The notification may indicate an opportunity to earn rewards or offer other incentive for performing the requested activity.

Data collaboration may involve gathering of evidence or forensic data related to certain objects or suspected counterfeiting. For example, if a user attempts authentication and finds an object to be unauthentic, an authentication application may supply a suggestion or offer with a set of instructions for the user to aid in data gathering. In this example, the user may be asked to, for example, confirm a location, supply images and video, or perform other authentications of objects located in the vicinity.

In some embodiments, authentications may be used as part of collection of specific marketing data. For example, authentication attempts related to marketplace goods may be aggregated and used to track or analyze consumer behavior. Digital fingerprints enable the tracking of individual objects and combining object tracking with user data provides a granular view of the relationships between an object (specific object—not only a class) and consumers, enabling more meaningful tracking of behavior. In another example, users may be incentivized to scan objects of interest, thereby notifying stakeholders that they would like to receive information related to specials, price changes, availability, etc. and creating a direct line of communication between the supplier and the consumer. All of these are examples that may be implemented as collaborative authentication projects.

In some embodiments, behaviors incentivized by stakeholders may include requests to the user to gather additional or supplemental data. For example, environmental data about how the object is stored or the location of the item. This could apply to obtaining supplier feedback about an object. For example, in the case of wine, an individual could share notes, and present the brand owner with various data and metadata about the item such as the date, time, and location of the authentication.

Authenticated data collaboration provides a mechanism to tie authentication of physical objects to social media platforms to drive awareness or promotions. For example, a network communication could show that certain stores or locations had authentic goods in stock.

Authenticated data collaboration provides individuals means to collaborate in group activities such as fighting counterfeiting. For example, forming brand teams or regional subgroups that can be recognized specifically by brand stakeholders.

Stakeholders

In a preferred embodiment, the incentive process extends not only to end users or customers but may include any parties who could collaboratively share data related to an induction or authentication. For example, an incentive could be offered by an authentication service provider, a government agency, supplier, brand stakeholder, or other third party. Incentives are aimed at motivating the customer, user, or intermediary to authenticate or induct an object. Users or groups of users (who may have no existing relationship to the database or the database proprietor) authenticate or induct physical objects and, in the process, perform additional data acquisition activities for the benefit of themselves and other stakeholders such as brand owners. For example, a brand owner may be the original vintner of a bottle of wine. Besides providing knowledge that their bottle is authentic, the vintner may also want to open a line of communication direct with their end customers.

Incentive Database

Data related to incentives may be stored in an incentive database that preforms such activities such as reward allocation. There may be different (and situation-dependent) rewards awarded for confirming results of the authentication or induction processes, for the provision of data, metadata, or other information about the object or the process.

In a preferred embodiment, a user or group of users are incentivized and/or compensated on any range of actions. Examples include a per-authentication or induction basis, whereby an individual supplies data or metadata on a particular item of interest, or as part of a broader contract. Other examples may include incentives based on regularity of supply data or on the amount or type of data provided. For instance, a user may be rewarded more based on their level of involvement, for example, supplying ten minutes of video instead of supplying a single image. In another example, users are paid a premium if they used additional equipment, such as a special microphone or infrared scanner.

Determining Incentives

In an embodiment, each incentive may be supplied or dynamically allocated (for example using machine learning, auctions, or some form of predictive modeling) based on existing data or desired behaviors to optimize results. This provides a means for letting stakeholders determine and set their own incentives at very granular levels. For example, higher rewards may be set for specific items such as a particular vintage of wine that may be thought to have been counterfeited.

In an embodiment, incentives may be different depending on several factors, which may include:
Whether the item is suitable for authentication or induction
Whether the item is successfully authenticated
The outcome of the matching result
The quantity, quality, and type of data or metadata captured
Location of the induction or authentication request
Whether and how the customer purchased and/or used the item
Contextual data and media such as audio, video, or images of the object's surrounding area including non-visible spectrum data such as infrared that is captured
User supplied testimony
Whether the incentive was created, offered, or distributed prior to or following an authentication attempt
Other factors as determined by stakeholders Incentive Schemes In an embodiment, a variety of schemes may be devised to incentivize customers to engage in activities within software, including, but not limited to, providing monetary compensation. Other non-financial incentives may also be employed, such as reputational, social, or anticipation of a future reward. Incentives may be structured to be intrinsic (such as words of praise, sense of achievement, recognition, etc.) or extrinsic rewards (such as financial or other tangible rewards, bonuses, benefits, etc.) or a combination of both.

An incentive may involve providing the customer with information about the item that is not generally available. There may be different (and situation-dependent) rewards paid out for positive or negative results of the authentication or induction process, for the provision of data, metadata, or other information about the object or the process.

An incentive may also comprise a mitigation effort by the user. For example, a suspect or a user with pending or issued charges may be incentivized to assist law enforcement.

In addition to incentive assessment, both matches and non-matches may be coupled with various other processes within the receiving system. Among such processes may be requests to the user to gather additional data, the issuing of alerts to brand holders of possible counterfeit goods or items of concern, alerts to authorities, and other processes.

Other incentive examples include: recognition, where a brand owner may broadcast or provide some sort of for public acknowledgement for assistance, such as an honorary title or publicity within certain communities; discounts, such as coupons or rebates; rewards such as merchandise; prioritized information, such as sharing new product knowledge with key customers first; or using gamification techniques, such as leader boards, badges, and achievements. The stakeholder setting the incentives may use one or more incentive types, combinations, or structuring of incentives.

In an embodiment, incentive allocation may apply individuals or groups of users. For example, within a community several users may choose to work together and share in compensation or as part of a gamification feature.

FIG. 9 is a simplified flow diagram of an example of a process for an application program for a collaborator to participate in collaborative authentication. (In an alternative embodiment, no special application may be needed. For example, a user may interact with a web page as a collaborator.) In this illustration, we assume a user app installed on a client device, block 902. The device (user) may receive a notice or invitation to collaborate, for example, from a collaborative authentication system or platform, block 904. Responsive to the notice (or request message), block 906, the user actuates the client device to induct an object or capture authentication data of a target object. The app stores the acquired data, and uses it to form a reply message, block 910. Then, the user (device) establishes a communication session, which may involve a login or other user authentication (or not), block 914. In that session, the client app uploads the authentication data to the server or platform, block 918, for example, in a reply message.

The user/client app may receive a message in response to the reply message, block 920. For example, in some cases, the platform may request additional or supplemental data associated with the object of the data that was uploaded. In some cases, additional information may be requested based on a non-match result from the database. Finally, the app may receive a message indicating allocation of a reward in consideration of the collaboration, block 926. The message may include the reward, or directions for redeeming the reward. Separately, a server side platform may track redemption of rewards for a collaborative authentication project. Redemption data may be used to update an incentives database, and thence used to analyze the corresponding project.

Figure 10:
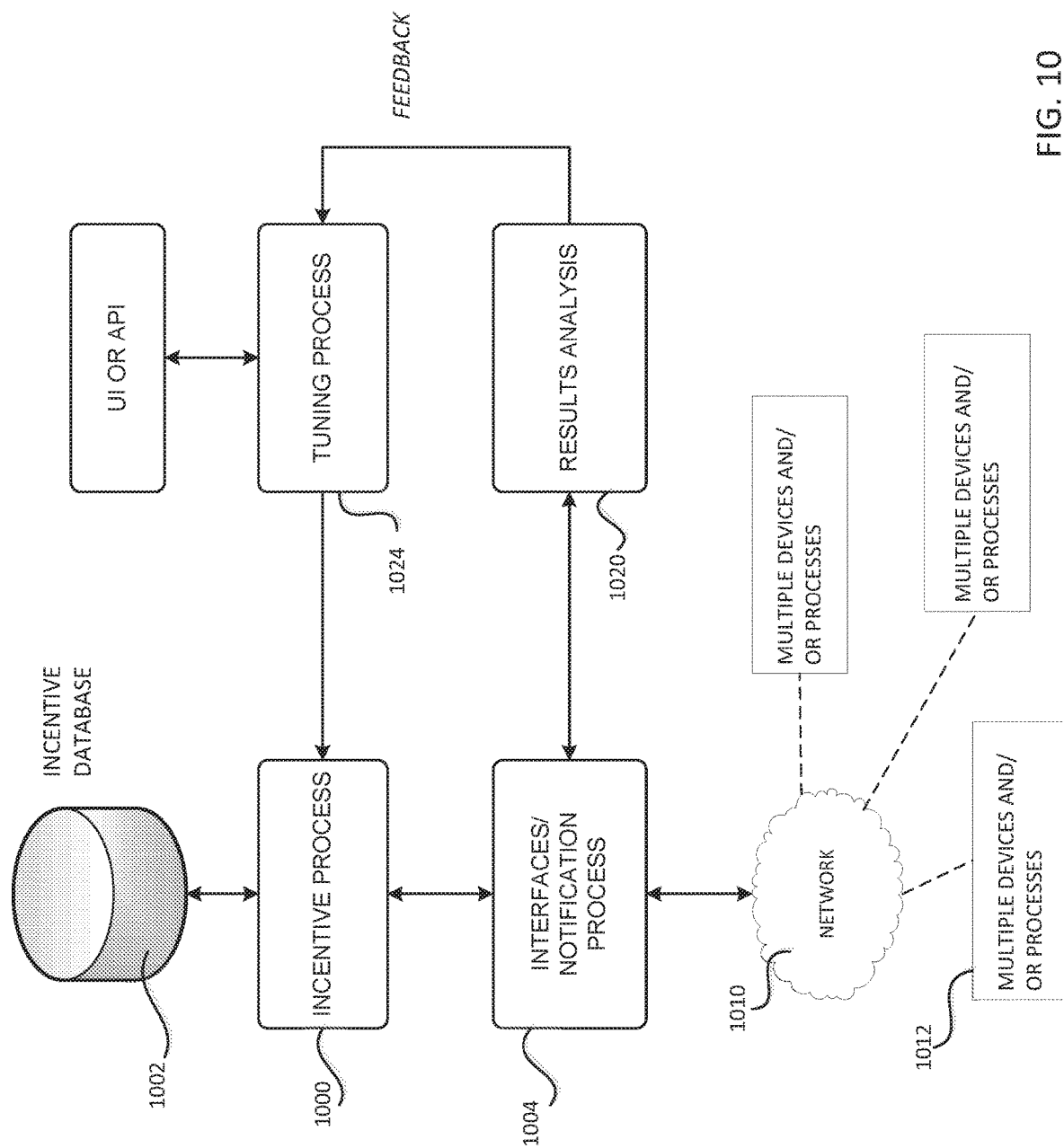
FIG. 10 is a simplified diagram illustrating a feedback loop for tuning a collaborative authentication project.

FIG. 10 is a simplified diagram illustrating a feedback loop for tuning a collaborative authentication project by modifying incentives. In this diagram, an incentive process or module 1000 is coupled to an incentive database 1002 which stores inventive data associated with a collaborative authentication project. The process 1000 is further coupled to an interfaces and notification process 1004 discussed earlier. This enables monitoring messaging traffic between the server platform and actual or potential collaborators. The actual or potential collaborators interact with various devices or processes, indicated at 1012. The messaging may traverse a network 1010 as discussed above.

A results analysis process or module 1020 may analyze the messaging between the platform and collaborators or potential collaborators, with regard to metrics such as, for example, collaboration request messages or posts, received replies, message counts, timing and content of the replies. These metrics are merely illustrative and not limiting. Other variables may include networks, message routes, hosts, locations, etc. associated with the various reply messages. Specific replies may be associated to previous replies from the same collaborator in other projects, to support analysis of the collaborator.

A tuning process 1024 may receive information from the results analysis module 1020, and from that feedback information determine a change to the incentives in use for the corresponding project. The tuning process 1024 may transmit the change or change request to the incentive process 1000. The incentive process may implement an incentive change in response to the request and update the incentive database 1002 accordingly. The incentive process 1000 may access project incentive rules or policies previously established by a sponsor in determining the incentive change. In an embodiment, the incentive process may utilize an algorithm to dynamically allocate rewards based on information created by actions or date received from a user or stakeholder. The feedback loop may be repeated during the project. The results analysis may be updated periodically, and it may be finalized and stored at the conclusion of a project. Indeed, it may be used to determine a conclusion of a project. Intermediate or final results analyses may be transmitted to a stakeholder.

Figure 11:
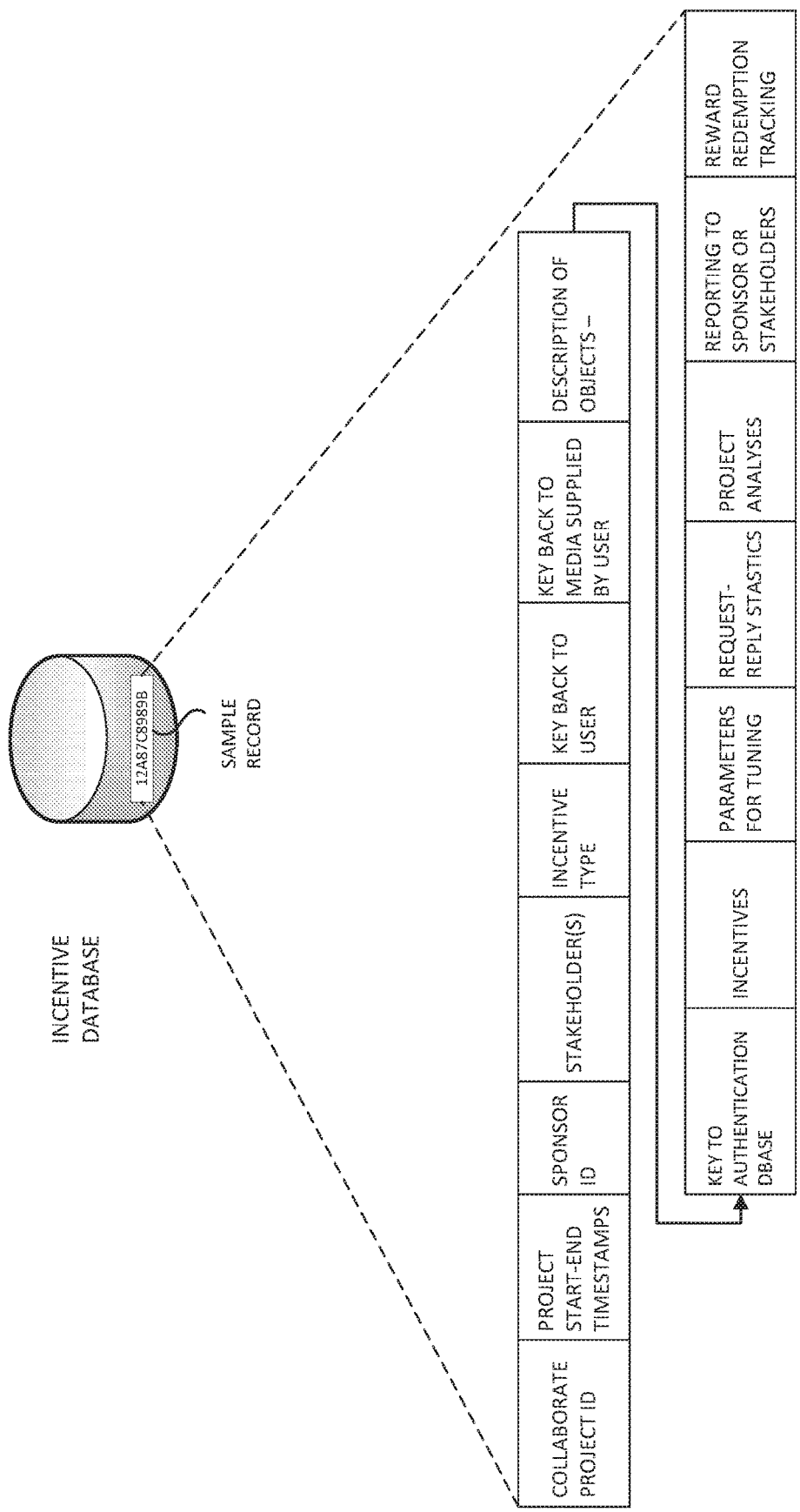
FIG. 11 is a simplified example of a record of an incentive database.

FIG. 11 is a simplified example of a sample record of an incentive database. The fields identified in the figure are merely illustrative. In some embodiments other fields may be used; while in some cases not all of the fields shown may be necessary. For some projects, records may vary from the structure shown. The sequence of the fields shown in the illustration is random.

It will be obvious to those having skill in the art that many changes may be made to the details of the above-described embodiments without departing from the underlying principles of the disclosure. The scope of the present disclosure should, therefore, be determined only by the following claims.

The invention claimed is:

1. A computer-implemented system comprising:
a network connection for digital communications;
an authentication database interface arranged for connection over a network to query an authentication database storing a plurality of digital fingerprints from one or more physical objects, the digital fingerprints formed from one or more pieces of image data that are derived for each object from the object itself;
a communication module having a plurality of lines of instructions that configure a processor included in the computer-implemented system to communicate over a network to a plurality of client devices;
an authentication module having a plurality of lines of instructions that configure the processor to:
select an authentication region in the one or more pieces of image data derived from each of the one or more physical objects;
extract, for each of the one or more physical objects, at least one feature vector from the authentication region, wherein the at least one feature vector describes at least one feature of the authentication region; and
form, for each of the one or more physical objects, the digital fingerprint from the at least one feature of the authentication region;
a collaboration module having a plurality of lines of instructions that configure the processor to generate and send a request message via the communication module to the plurality of client devices, the request message including an identifier of an object of interest, and an invitation to a collaborator to capture a piece of image data of a target object associated with the identifier;
the plurality of lines of instructions included in the collaboration module further configure the processor to receive a plurality of reply messages via the communication module from the plurality of client devices, and for each received reply message—
associate the reply message to a corresponding request message to ensure that the captured piece of image data is properly associated with the object of interest;
extract the captured piece of image data from the reply message;
cause the authentication database interface to query the authentication database based on the identifier and the captured piece of image data of the target object to obtain a matching result;
in a case that the matching result indicates that a matching record was found in the database, cause the authentication database interface to update the matching record to include the captured piece of image data and an associated piece of metadata, the associated piece of metadata including an identifier of the collaborator that submitted the reply message, so as to enrich an authentication dataset with one or more pieces of data provided by one or more collaborators in the reply messages.

2. The system of claim 1, wherein the plurality of lines of instructions included in the collaboration module further configure the processor to manage a collaborative authentication project, wherein the collaborative authentication project includes a data record having an identifier of the project, a sponsor of the project, an initial incentive, and a summary of data acquired from a plurality of collaborators in the project.

3. The system of claim 2, further comprising an incentive database interface arranged for connection over a network to query an incentive database storing one or more pieces of data associated with one or more collaborative authentication projects.

4. The system of claim 2, wherein the plurality of lines of instructions included in the collaboration module further configure the processor to:
analyze one or more pieces of data stored in an incentive database for a given collaborative authentication project;
and, based on the analysis, change the initial incentive to a second incentive to encourage collection of additional pieces of authentication data by the given collaborative authentication project.

5. The system of claim 2, wherein the plurality of lines of instructions included in the collaboration module further configure the processor to:
analyze one or more pieces of data stored in an incentive database for a given collaborative authentication project;
and, based on the analysis, generate a report and transmit, via the communication module, the report to a stakeholder associated with the given collaborative authentication project.

6. The system of claim 2, wherein the plurality of lines of instructions included in the collaboration module further configure the processor to: generate a report for one or more individual objects or one or more sets of objects based on data stored in the collaborative authentication database, wherein the report includes at least one of a location of the one or more objects over time, an audit trail, a point of entry of a counterfeit good, and an exposure to one or more environmental variables over a course of a lifetime of the one or more objects.

7. The system of claim 2, wherein the plurality of lines of instructions included in the collaboration module further configure the processor to:
query the authentication database to determine a non-matching result for the object of interest was found in the database; and
in response to the non-matching result, cause the communication module to transmit a message to the corresponding reply message sender indicating that the non-matching result was found.

8. The system of claim 7, wherein the plurality of lines of instructions included in the collaboration module further configure the processor to:
in response to the non-matching result, store a piece of authentication attempt metadata in association with the object of interest.

9. The system of claim 8, wherein the plurality of lines of instructions included in the collaboration module further configure the processor to:
analyze the piece of stored authentication attempt metadata in association with the object of interest; and based on the analysis, generate a counterfeit warning message to a stakeholder associated with the object of interest.

10. A computer-implemented method comprising:
querying, over a network connection, an authentication database storing a plurality of digital fingerprints from one or more physical objects, the digital fingerprints formed from one or more pieces of image data that are derived for each object from the object itself;
selecting, by an authentication module, an authentication region in the one or more pieces of image data from each of the one or more physical objects;
extracting, for each of the one or more physical objects, at least one feature vector from the authentication region, wherein the feature vector describes at least one feature of the authentication region; and
forming, for each of the one or more physical objects, the digital fingerprint from the at least one feature of the authentication region;
generating and sending, by a collaboration module, a request message to a plurality of client devices, the request message including an identifier of an object of interest, and an invitation to a collaborator to capture a piece of image data of a target object associated with the identifier;
receiving, by the collaboration module, a plurality of reply messages via a communication module from the plurality of client devices, and for each received reply message—
associating the reply message to a corresponding request message to ensure that the captured piece of image data is properly associated with the object of interest;
extracting the captured piece of image data from the reply message;
querying the authentication database based on the identifier and the captured piece of image data of the target object to obtain a matching result;
in a case that the matching result indicates that a matching record was found in the database, updating the matching record to include the captured piece of image data and an associated piece of metadata, the associated piece of metadata including an identifier of the collaborator that submitted the reply message, so as to enrich an authentication dataset with one or more pieces of data provided by one or more collaborators in the reply messages.

11. The method of claim 10, further comprising:
managing, by the collaboration module, a collaborative authentication project, wherein the collaborative authentication project includes a data record having an identifier of the project, a sponsor of the project, an initial incentive, and a summary of one or more pieces of data acquired from collaborators in the project.

12. The method of claim 11, further comprising querying, by an incentive database interface, an incentive database storing one or more pieces of data associated with one or more collaborative authentication projects.

13. The method of claim 12, further comprising:
analyzing, by the collaboration module, one or more pieces of data stored in the incentive database for a given collaborative authentication project;
and, based on the analyzing, changing the initial incentive to a second incentive to encourage collection of additional pieces of authentication data by the given collaborative authentication project.

14. The method of claim 12, further comprising:
analyzing, by the collaboration module, one or more pieces of data stored in the incentive database for a given collaborative authentication project;
and, based on the analyzing, generating a report and transmitting, via the communication module, the report to a stakeholder associated with the given collaborative authentication project.

15. The method of claim 11, further comprising generating, by the collaboration module, a report on one or more individual objects or on one or more sets of objects based on data stored in the collaborative authentication database, wherein the report includes at least one of a location of the one or more objects over time, an audit trail, a point of entry of a counterfeit good, and an exposure to one or more environmental variables over a course of a lifetime of the one or more objects.

16. The method of claim 10, further comprising:
querying the authentication database, by the collaboration module, to determine a non-matching result for the object of interest was found in the database; and
in response to the non-matching result, causing the communication module to transmit a message to the corresponding reply message sender indicating that non-matching result was found.

17. The method of claim 16, further comprising in response to the non-matching result, storing, by the collaboration module, a piece of authentication attempt metadata in association with the object of interest.

18. The method of claim 17, further comprising:
analyzing, by the collaboration module, the piece of stored authentication attempt metadata in association with the object of interest; and
based on the analysis, generating a counterfeit warning message to a stakeholder associated with the object of interest.

* * * * *